United States Patent [19]
Yoneda et al.

[11] Patent Number: 6,151,078
[45] Date of Patent: *Nov. 21, 2000

[54] METHOD OF TRANSMITTING VIDEO DATA, VIDEO DATA TRANSMITTING APPARATUS, AND VIDEO DATA REPRODUCING APPARATUS

[75] Inventors: Yasushi Yoneda, Ikeda; Yasuo Masuda, Hirakata, both of Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,376

[22] PCT Filed: Apr. 4, 1997

[86] PCT No.: PCT/JP97/01180

§ 371 Date: Dec. 4, 1997

§ 102(e) Date: Dec. 4, 1997

[87] PCT Pub. No.: WO97/38528

PCT Pub. Date: Oct. 16, 1997

[30] Foreign Application Priority Data

Apr. 5, 1996 [JP] Japan .................................. 8-084129
Feb. 21, 1997 [JP] Japan .................................. 9-037839

[51] Int. Cl.⁷ ............................... H04N 5/46; H04N 3/27
[52] U.S. Cl. ............................ 348/558; 348/465; 348/554
[58] Field of Search .................................. 348/554, 555, 348/558, 473, 563, 465, 467, 423; 370/465, 522, 537, 538

[56] References Cited

U.S. PATENT DOCUMENTS

| | | | |
|---|---|---|---|
| 4,837,626 | 6/1989 | Nishiyama et al. | 348/554 |
| 5,170,251 | 12/1992 | Levy | 348/446 |
| 5,173,774 | 12/1992 | Bretl et al. | 348/555 |
| 5,365,276 | 11/1994 | Imai et al. | 348/556 |
| 5,387,940 | 2/1995 | Kwok et al. | 348/446 |
| 5,410,354 | 4/1995 | Uz | 348/426 |
| 5,444,491 | 8/1995 | Lim | 348/441 |
| 5,502,497 | 3/1996 | Yamanishi et al. | . |
| 5,515,106 | 5/1996 | Chaney et al. | . |
| 5,557,302 | 9/1996 | Levinthal et al. | 345/189 |
| 5,687,334 | 11/1997 | Davis et al. | 395/339 |
| 5,898,463 | 4/1999 | Nishiyama | 348/554 |

FOREIGN PATENT DOCUMENTS

| | | |
|---|---|---|
| 4-172885 | 6/1992 | Japan . |
| 5-64167 | 3/1993 | Japan . |
| 8-70451 | 3/1996 | Japan . |

Primary Examiner—Thomas G. Black
Assistant Examiner—Uyen Le
Attorney, Agent, or Firm—Parkhurst & Wendel, L.L.P.

[57] ABSTRACT

A method of transmitting video data is characterized wherein plural pieces of video data of plural broadcast programs are divided into packets, respectively, and the plural packets of the video data and packets including information about the broadcast programs are multiplexed and transmitted, video data whose reproduction mode is non-interlace scanning and video data whose reproduction mode is interlaced scanning are transmitted as the pieces of video data of the plural broadcast programs, and the information for judging whether the video data of a broadcast program is of a non-interlace scanning type or of an interlaced scanning type being described in a packet including information about the broadcast programs is transmitted.

15 Claims, 27 Drawing Sheets

Fig.4 code assignment for lower order 8 bits of system management ID
(identification of techniques at private level)

| code | type of video |
|------|---------------|
| 0x01 | interlaced scanning |
| 0x02 | non-interlace scanning |

Fig.5 code assignment for middle order 6 bits of system management ID
(identification of techniques at notification level)

| code | type of video |
|------|---------------|
| 1 | interlaced scanning |
| 2 | non-interlace scanning |

Fig.9 code assignment for component type (for non-interlace scanning type)

| code | type of video |
|------|---------------|
| 0x21 | non-interlace scanning type video, aspect ratio 4:3 |
| 0x22 | non-interlace scanning type video, aspect ratio 16:9, with pan vector |
| 0x23 | non-interlace scanning type video, aspect ratio 16:9, without pan vector |
| 0x24 | non-interlace scanning type video, letter box |
| 0x31 | non-interlace scanning type still picture, aspect ratio 4:3 |
| 0x32 | non-interlace scanning type still picture, aspect ratio 16:9, with pan vector |
| 0x33 | non-interlace scanning type still picture, aspect ratio 16:9, without pan vector |
| 0x34 | non-interlace scanning type still picture, letter box |

Fig.10 code assignment for component type (for interlaced scanning type)

| code | type of video |
|------|---------------|
| 0x01 | interlaced scanning type video, aspect ratio 4:3 |
| 0x02 | interlaced scanning type video, aspect ratio 16:9, with pan vector |
| 0x03 | interlaced scanning type video, aspect ratio 16:9, without pan vector |
| 0x04 | interlaced scanning type video, letter box |
| 0x11 | interlaced scanning type still picture, aspect ratio 4:3 |
| 0x12 | interlaced scanning type still picture, aspect ratio 16:9, with pan vector |
| 0x13 | interlaced scanning type still picture, aspect ratio 16:9, without pan vector |
| 0x14 | interlaced scanning type still picture, letter box |

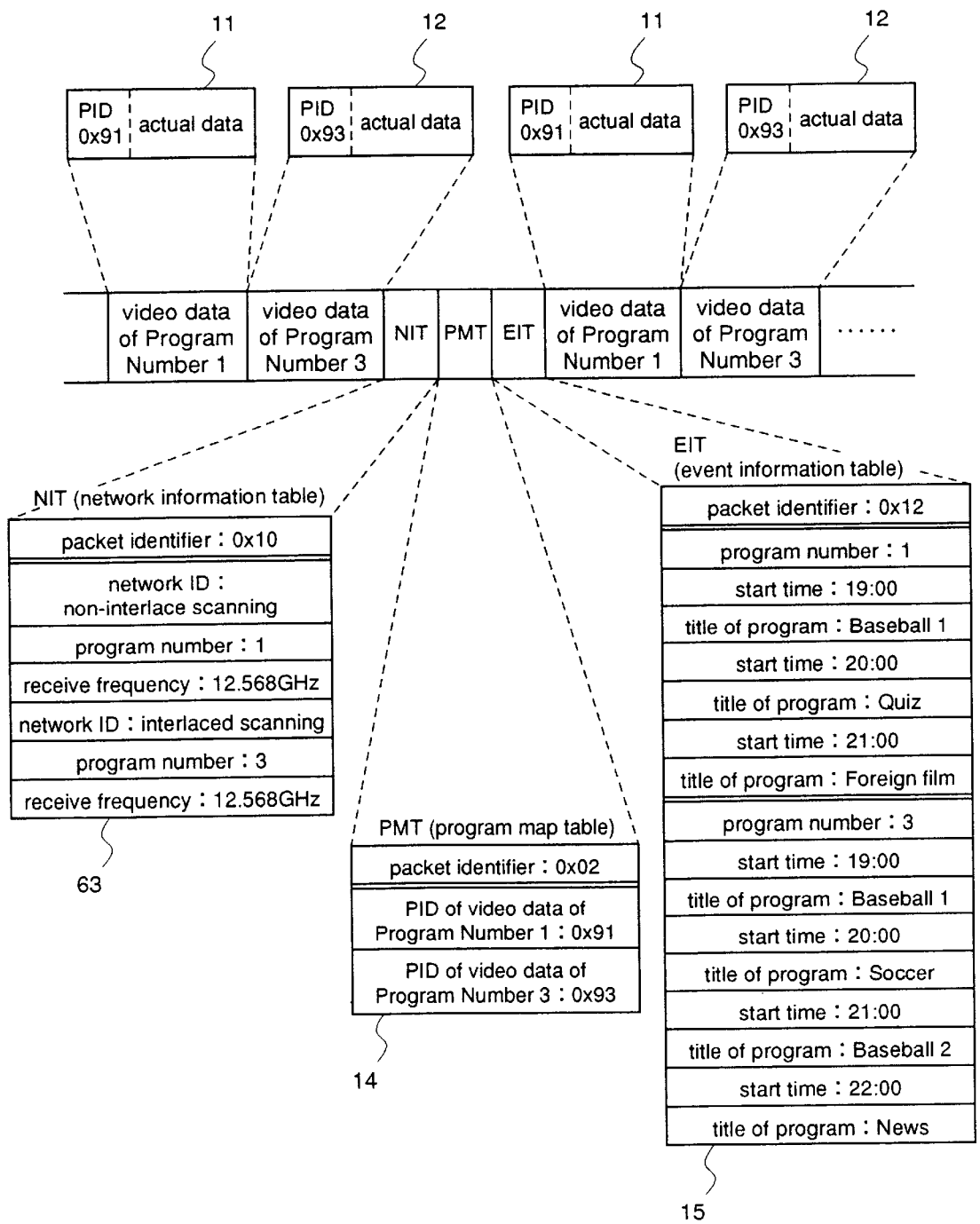

Fig.12

NIT network information table

| | |
|---|---|
| table ID | 8 |
| section syntax instruction | 1 |
| reserve | 3 |
| section length | 12 |
| network ID | 16 |
| reserve | 2 |
| version number | 5 |
| Current_next_indicator | 1 |
| section number | 8 |
| final section number | 8 |
| reserve | 4 |
| descriptor length | 12 |
| descriptor ⋮ | |

Fig.13 code assignment for network ID

| code | type of video |
|---|---|
| 0x0001 | interlaced scanning |
| 0x0002 | non-interlace scanning |

Fig.20 the screen of a display unit

| non-interlace scanning type program guide |||| interlaced scanning type program guide ||||
|---|---|---|---|---|---|
| time | channel || time | channel ||
|  | 1 | 3 |  | 1 | 3 |
| 19:00-20:00 | Baseball 1 |  | 19:00-20:00 |  | Baseball 1 |
| 20:00-21:00 |  | Soccer | 20:00-21:00 | Quiz |  |
| 21:00-22:00 | Foreign film | Baseball 2 | 21:00-22:00 |  |  |
| 22:00-23:00 |  | News | 22:00-23:00 |  |  |

Fig.21 the screen of a display unit

| program guide |||||
|---|---|---|---|---|
| time | channel ||||
|  | 1 | scan information | 3 | scan information |
| 19:00-20:00 | Baseball 1 | non-interlace scanning | Baseball 1 | interlaced scanning |
| 20:00-21:00 | Quiz | interlaced scanning | Soccer | non-interlace scanning |
| 21:00-22:00 | Foreign film | non-interlace scanning | Baseball 2 | non-interlace scanning |
| 22:00-23:00 |  |  | News |  |

Fig.23

NIT network information table

| | |
|---|---|
| table ID | 8 |
| section syntax instruction | 1 |
| reserve | 3 |
| section length | 12 |
| network ID | 16 |
| reserve | 2 |
| version number | 5 |
| Current_next_indicator | 1 |
| section number | 8 |
| final section number | 8 |
| reserve | 4 |
| descriptor length | 12 |
| descriptor | |
| program list<br>⋮ program number<br>⋮ service type<br>⋮ program number<br>⋮ service type<br>⋮       ⋮ | |

Fig.24 code assignment for service type

| code | type of video |
|---|---|
| 0x01 | interlaced scanning type digital broadcasting TV |
| 0x02 | interlaced scanning type NVOD reference |
| 0x03 | interlaced scanning type NVOD time shifted |
| 0x04 | interlaced scanning type mosaic |
| 0x05 | non-interlace scanning type digital broadcasting TV |
| 0x06 | non-interlace scanning type NVOD reference |
| 0x07 | non-interlace scanning NVOD time shifted |
| 0x08 | non-interlace scanning type mosaic |

Fig.27 code assignment to service type

| code | type of video |
|---|---|
| 0x01 | interlaced scanning type digital broadcasting TV |
| 0x02 | interlaced scanning type NVOD reference |
| 0x03 | interlaced scanning type NVOD time shifted |
| 0x04 | interlaced scanning type mosaic |
| 0x05 | non-interlace scanning type digital broadcasting TV |
| 0x06 | non-interlace scanning type NVOD reference |
| 0x07 | non-interlace scanning type NVOD time shifted |
| 0x08 | non-interlace scanning type mosaic |
| 0x11 | interlaced scanning - non-interlace scanning mixed scan type digital broadcasting TV |
| 0x12 | interlaced scanning - non-interlace scanning mixed scan type NVOD reference |
| 0x13 | interlaced scanning - non-interlace scanning mixed scan type NVOD time shifted |
| 0x14 | interlaced scanning - non-interlace scanning mixed scan type mosaic |

Fig.31
PRIOR ART

| time | channel | |
|---|---|---|
| | 1 | 3 |
| 19:00-20:00 | Baseball 1 | Baseball 1 |
| 20:00-21:00 | Quiz | Soccer |
| 21:00-22:00 | Foreign film | Baseball 2 |
| 22:00-23:00 | | News |

6,151,078

METHOD OF TRANSMITTING VIDEO DATA, VIDEO DATA TRANSMITTING APPARATUS, AND VIDEO DATA REPRODUCING APPARATUS

TECHNICAL FIELD

The present invention relates to a method of transmitting video data, a video data transmitting apparatus, and a video data reproducing apparatus. More particularly, it relates to a method of transmitting video data, a video data transmitting apparatus, and a video data reproducing apparatus for identifying pieces of video data whose video reproduction modes are different to reproduce the same.

BACKGROUND ART

For television broadcasting, it is essential that videos, i.e., moving pictures are converted into television signals and transmitted, and a receiver receives these signals and performs reproduction processing to obtain the moving pictures and display them. In the case of sound signal which allows to treat a relation between time and sound pressure as one-dimensional one, instantaneous sound pressures (during a short time period) can be directly converted into electric signals. On the other hand, in the case of moving picture, if it is partitioned into still pictures at short time intervals, each still picture is planar, that is, two-dimensional information and therefore it is necessary to, prior to the conversion into signals, make their planes one-dimensional by scanning, so that the plane can be treated as a plurality of scan lines. Scan methods for obtaining a plurality of scan lines from pictures includes non-interlace scanning and interlaced scanning. Non-interlace scanning is a method in which all of the scan lines on a frame (a screen) are sequentially scanned from top to bottom to display a video image, and interlaced scanning is a method in which every other scan line is scanned.

When the display performance of a display device is not so high, non-interlace scanning causes flicker on screen due to the increase of the time difference between the top and the bottom of the scanning. Therefore, interlaced scanning is mainly employed in the conventional television broadcasting. In the NTSC system which is known as a common television system, assuming that one frame (screen) consists of 525 scan lines, two kinds of scanning, scanning for odd lines and scanning for even lines are performed, which means that two fields are scanned.

If the display device has a high display performance, however, the flicker on screen can be reduced by means of non-interlace scanning. Generally, a number of display times per second for a non-interlace scanning type computer display is approximately a double of the number of display times per second for an interlace scanning type one. Therefore, non-interlace scanning has captured much of the spotlight in the field of high-definition television or the like because it enables superior picture quality and high affinity for CG (computer graphics) or the like.

On the other hand, when moving pictures are digitized to be recorded and transmitted or received as digital data, the digitized data is generally treated as compressed code. As standardized moving picture compression technique, most common is MPEG (Moving Picture Experts Group), which is described in *Latest Manual of MPEG* (Ascii Co., Ltd, First Edition, published on Aug. 1, 1994) and *Practical Manual of MPEG* (Ascii Co., Ltd, First Edition, Published by (Nov. 1, 1995). These books also refer to the well-known transmission and reception methods for video data and video data reproducing apparatuses on the basis of MPEG standard.

In the prior art, techniques for transmitting and receiving video data based on MPEG standard have been established on the assumption that video data based on interlaced scanning is exclusively used because interlaced scanning is common in television broadcasting as described above. On the other hand, in the case of using videos based on non-interlace scanning, developments and the like have been developed on the assumption that video data subjected to non-interlace scanning is exclusively used.

The following description is on the conventional transmission and reception of video data using video image subjected to interlaced scanning which is common in television broadcasting or the like. As a first example of the prior art technique, a system for providing digital television broadcasting is described.

FIG. 29 is a diagram illustrating a structure of the data transmitted by the method of transmitting and receiving video data according to the first example of the prior art. As shown in the figure, video data of Program Number 1, video data of Program Number 3, and service information such as NIT (Network Information Table), PMT (Program Map Table), EIT (Event Information Table) are multiplexed on a packet basis within a band whose center is at a receive frequency of 12.568 GHz. In digital data transmission based on MPEG standard, since a plurality of programs (which correspond to channels in normal analog broadcasting) can be multiplexed and transmitted, the above-described pieces of service information are used to select a desired broadcast program in a desired program from the multiplexed transmission data, and these pieces of service information are thus multiplexed with the data to be transmitted.

Although the data structure of these packets and the standards on multiplexing of the packets are defined in detail in MPEG, here a description is given only of the portions particularly related.

Reference numeral 11 designates a packet of video data of Program Number 1 (channel 1). The packet identifier PID as the header is defined as 0x91 so that this packet can be identified as the packet of the video data of Program Number 1. Reference numeral 12 designates a packet of video data of Program Number 3 (channel 3). The packet identifier PID as the header is defined as 0x93 so that this packet can be identified as the packet of the video data of Program Number 3.

Reference numerals 13 to 15 designate packets of service information. Reference numeral 13 designates NIT (Network Information Table) packet which defines respective frequencies on which the video data of Program Number 1 and that of Program Number 3 are transmitted. This example shows that both the video data of Program Number 1 and that of Program Number 3 are multiplexed in the band of 12.568 GHz. Reference numeral 14 designates a PMT (program map table) packet. This example shows that the video data of Program Number 1 is included in a packet whose packet identifier is 0x91, the video data of Program Number 3 is included in a packet whose packet identifier is 0x93. Reference numeral 15 designates an EIT (event information table) packet. This example shows that in Program Number 1, "Baseball 1" will be aired from 19:00 to 20:00, "Quiz" from 20:00 to 21:00, and "Foreign film" from 21:00, and that in Program Number 3, "Baseball 1" will be aired from 19:00 to 20:00, "Soccer" from 20:00 to 21:00, "Baseball 2" from 21:00 to 22:00, and "News" from 22:00.

FIG. 30 is a diagram illustrating a prior art method of transmitting video data. Referring to the figure, numeral 100 designates a video data transmitting apparatus which is at a transmitting end, and numeral 200 designates a video data reproducing apparatus which is at a receiving end. In the video data transmitting apparatus 100, reference numeral 22 designates a video data storage unit for storing interlaced scanning type video data. Numeral 24 designates a multiplexing unit for multiplexing interlaced scanning type video data and the information relative to the data. Numeral 25 designates a transmitting unit for transmitting the signals multiplexed by the multiplexing unit 24. In the video data reproducing apparatus 200, reference numeral 1 designates a receiving unit for receiving the transmitted multiplexed signal, i.e., the signal shown in FIG. 22 consisting of the video data of Program Number 1, the video data of Program Number 3, NIT, PMT, and EIT. Reference numeral 2 designates a separating unit for separating the multiplexed signals received by the receiving unit 1, numeral 6 designates a program selecting unit for accepting selection operation of broadcast program from viewer and informing the receiving unit 1 and the separating unit 2 of the selected broadcast program. As the program selecting unit 6, widely-used popular selector may be employed such as a remote controller for selecting television program, channel buttons of a television receiver or a mouse of a personal computer. Reference numeral 4 designates an interlaced scanning type video decoding unit for decoding interlaced scanning type video data separated by the separating unit 2 and outputting the decoded data as a video signal.

Common video data reproducing apparatus further requires, other than the above, various components such as a decoding unit for decoding audio data. However, since these are not directly related to the present invention, they are not described for the sake of simplicity of explanation.

Next, the operations of the prior art video data transmitting apparatus and the prior art video data reproducing apparatus will be described.

Initially, in the video data transmitting apparatus 100, the multiplexing unit 24 multiplexes the interlaced scanning type video data of Program Number 1 and that of Program Number 3, and NIT, PMT, and EIT as the service information in packets of predetermined bit lengths as shown in FIG. 29, followed by the transmission from the transmitting unit 25.

The transmitted multiplexed signal is sent through a transmission medium such as electric wave or cable to viewer's reproducing apparatus where the viewer can utilize the signal. In the video data reproducing apparatus 200, video data is reproduced as follows.

First of all, the program selecting unit 6 accepts selection operation of broadcast program from viewer and informs the receiving unit 1 of the broadcast program designated according to the selection. This designation may be done directly by switching or inputting a numerical value as in the case of designating channel at a normal television receiver, and the selection may be carried out through a visual interface such as a program table which will be later described.

The receiving unit 1 receives a signal of a frequency on which the video data of the designated broadcast program (Program Number) is transmitted. Since a transmission signal of any receive frequency is multiplexed with an NIT of the same contents to be transmitted, the receiving unit 1 recognizes, from the contents described in the NIT, on which receive frequency the video data of the designated Program Number is transmitted, to perform selection of receive frequency.

The separating unit 2 separates video data from the information received by the receiving unit 1, according to the program selecting unit 6. More specifically, if the program selecting unit 6 instructs to reproduce the data of Program Number 1, the separating unit recognizes that the packet identifier PID of the video data of Program Number 1 is 0x91 from the contents of the PMT, and extracts a packet whose packet identifier PID is 0x91, and transmits it to the next stage. If it is instructed to reproduce the data of Program Number 3, as in the above case, the separating unit recognizes that the packet identifier PID of the video data of Program Number 3 is 0x93 from the contents of the PMT, extracts a packet whose packet identifier PID is 0x93, and transmits it to the next stage.

Thereby, the target video data is processed to reproduce a desired video. The interlaced scanning type video decoding unit 4 decodes the video data separated by the separating unit 2 in interlaced scanning mode to output it as a video signal, and the video display unit 8 receives the video signal output from the interlaced scanning type video decoding unit 4 as an input and displays a video image corresponding to the input signal on the screen.

FIG. 31 illustrates a program guide which is displayed on the screen of the conventional video data reproducing apparatus which performs display of the program guide. The conventional video data reproducing apparatus for performing display of the program guide processes the information of the EIT (event information table) in FIG. 29 and displays it on a screen in a form which is visually accessible to viewer, and the viewer views the program guide displayed on screen and selects a desired broadcast program using cursor, remote control key, or the like.

Next, a description is given of a second example of the prior art technology which is a system for providing plural types of services, for example, two types of services comprising digital television broadcasting and mosaic broadcasting. FIGS. 33 are diagrams for explaining these types of services. FIG. 33(*a*) illustrates digital television broadcasting which displays one program on one screen like the normal television broadcasting. FIG. 33(*b*) illustrates mosaic broadcasting which obtains unique effects by splitting the screen and displaying different video images in the resultant respective blocks. In this example, information for identifying the types of the services has to be transmitted, for comparison with the first example.

FIG. 32 is a diagram showing the structures of the data transmitted by the video data transmission method according to the second example of the prior art technique. Similarly as in the first example, the video data of Program Number 1 and that of Program Number 3, and NIT (network information table), PMT (program map table), and EIT (event information table) as the service information are multiplexed on a packet basis within a frequency band whose center is at a receive frequency of 12.568 GHz. In the present example, SDT (Service Description Table) is also multiplexed on a packet basis.

Referring to FIG. 32, the data structures of the video data portions 11 and 12, and the structures of the PMT 14 and EIT 15 among as the service information are identical to those in the first example. In this present example, the NIT includes the information about service types for the respective Program Numbers, and the SDT 16 includes information about service types and service names for the respective Program Numbers.

Also in the second example, the structures of the transmitting apparatus and the receiving apparatus are identical to those in the first example, and thus FIG. 30 is used for describing them.

A description is given of the operations of the video data transmitting apparatus 100 and the video data receiving apparatus 200. Initially, formation and transmission of multiplexed signals are performed by the video data transmitting apparatus 100 in the same manner as in the first example, and the multiplexed signal as shown in FIG. 32 is received by the video data reproducing apparatus 200. In the video data reproducing apparatus 200, reproduction is performed in the following steps: when separating video data to transmit the same, the separating unit 2 obtains the information of the service type from the service information NIT or SDT and transmits the information to the interlaced scanning type video decoding unit 4; the interlaced scanning type video decoding unit 4 performs decoding processing dependent on whether that service type is digital broadcasting or mosaic broadcasting. The operations other than the above one are the same as those of the first example and therefore will not be described.

Although the first and second examples exclusively handle interlaced scanning type video data, non-interlace scanning type video data may be handled in the same manner as described when the video data transmitting apparatus is configured to form and transmit multiplexed signals using non-interlace scanning type data and the video data reproducing apparatus is configured to have a non-interlace scanning type decoding unit in place of the interlaced scanning type decoding unit.

As described above, although interlaced scanning is popular as a method for scanning pictures, non-interlace scanning is also expected to be used increasingly in the future, and it is even thought that both interlaced scanning type video data and non-interlace scanning type video data might be supplied to a same digital broadcasting system. Therefore, it can be predicted that demands for a video reproducing apparatus capable of reproducing videos according to each of the scan methods would increase.

In the prior art video data reproducing apparatus described above, when non-interlace scanning type video data is multiplexed and transmitted, the interlaced scanning type video decoding unit cannot perform decoding correctly, whereby correct video signals cannot be output.

Even when pieces of data of the both scanning types are mixedly supplied to the foregoing reproducing apparatus, problems do not occur as long as the interlaced scanning type data only is reproduced. However, since it is difficult to see, from a program guide displayed by the prior art video data reproducing apparatus, whether the broadcast program is of a non-interlaced scanning type or of an interlaced scanning type, as shown in FIG. 31, viewer might erroneously select a broadcast program whose scanning type is different from that of the video decoding unit of the video data reproducing apparatus. In the above-described video data reproducing apparatus of FIG. 30 which includes the interlaced scanning type video decoding unit only, when viewer selects a broadcast program in a non-interlace scanning type program, the video data cannot be reproduced correctly and distorted video images are output.

The foregoing problems are common in the first and second examples, and the systems configured to correspond only to the non-interlace scanning type video data cannot handle the interlaced scanning type video data similarly.

Thus, in the prior art video data transmission method and the video data transmitting apparatus, since a multiplexed signal is transmitted including only one of the interlaced scanning type video data and the non-interlace scanning type video data, the degree of freedom in programing of television broadcasting programs is limited.

Further, as described above, since the prior art video data reproducing apparatus includes only one of the interlaced scanning type video decoding unit which decodes interlaced scanning type video data and the non-interlace scanning type video decoding unit which decodes non-interlace scanning type video data, the program whose scan method is different from that of the video decoding unit provided therein cannot be reproduced correctly.

Furthermore, since the prior art video data reproducing apparatus for performing display of the program guide displays on the screen a program guide which makes it difficult to know whether each broadcast program is of a non-interlace scanning type or of an interlaced scanning type, viewer tends to erroneously select a broadcast program of a scan method by which the video data reproducing apparatus cannot perform correct reproduction.

To solve the above problems, provided is the present invention which has an object to provide a video data transmitting method in which both interlaced scanning type video data and non-interlace scanning type video data can be transmitted so that the receiving end can reproduce data of both scanning types correctly, resulting in improved degree of freedom in programing of broadcast programs to be transmitted.

The present invention has another object to provide a video data reproducing apparatus which receives a signal transmitted by the method of transmitting video data in which both interlaced scanning type video data and non-interlace scanning type video data are transmitted, reproduces both the interlaced scanning type video data and the non-interlace scanning type video data correctly, and displays the reproduced data.

The present invention has still further object to provide a video data reproducing apparatus capable of confirming the scan method for a broadcast program to be selected when reproducing one of plural broadcast programs transmitted according to the video data transmission method in which both the interlaced scanning type video data and the non-interlace scanning type video data are transmitted, thereby preventing incorrect selection.

DISCLOSURE OF THE INVENTION

To achieve the above objectives, provided is a method of transmitting video data according to claim 1 wherein, in a method of transmitting video data in which plural pieces of video data of plural broadcast programs are divided into packets, respectively, and the plural packets of the video data and packets including information about the broadcast programs are multiplexed and transmitted, video data whose reproduction mode is non-interlace scanning and video data whose reproduction mode is interlaced scanning are both transmitted as the pieces of video data of plural broadcast programs, and the information for judging whether the video data of a broadcast program is of a non-interlace scanning type or of an interlaced scanning type being described in a packet including information about the broadcast programs is transmitted.

According to a method of transmitting video data of claim 2, in the method of transmitting video data according to claim 1, the packet including the information about the broadcast programs is a program map table which shows through which packet a broadcast program is transmitted.

According to a method of transmitting video data of claim 3, in the method of transmitting video data of claim 1, the packet including the information about broadcast programs is an event information table which shows the contents of the video data of a broadcast program.

According to a method of transmitting video data of claim 4, in the method of transmitting video data of claim 1, the packet including the information about the broadcast programs is a network information table which shows through which channel a broadcast program is transmitted.

According to a method of transmitting video data of claim 5, in the method of transmitting video data of claim 1, the packet including the information about the broadcast programs is a service description table which shows the information about provision of video data.

According to the method of transmitting video data of claim 6, in the method of transmitting video data of claim 2, the information for judging whether the video data of a broadcast program is of a non-interlace scanning type or of an interlaced scanning type is described in a system management identifier which is one of system management descriptors as the descriptors about program information in the program map table.

According to a method of transmitting video data of claim 7, in the method of transmitting video data of claim 3, the information for judging whether the video data of a broadcast program is of a non-interlace scanning type or of an interlaced scanning type is described in a component identifier indicating the attribute of video data in the event information table.

According to a method of transmitting video data of claim 8, in the method of transmitting video data of claim 4, the information for judging whether the video data of a broadcast program is of a non-interlace scanning type or of an interlaced scanning,type is described in a network identifier in the network information table, which identifier identifies a network through which video data is transmitted.

According to a method of transmitting video data of claim 9, in the method of transmitting video data of claim 4, the information for judging whether the video data of a broadcast program is of a non-interlace scanning type or of an interlaced scanning type is described in a service type identifier included among service list descriptors in the network information table, which descriptors describe the information about provision of video data.

According to a method of transmitting video data of claim 10, in the method of transmitting video data of claim 5, the information for judging whether the video data of a broadcast program is of a non-interlace scanning type or of an interlaced scanning type is described in a service type identifier in the service description table, which identifier shows the service type.

According to a method of transmitting video data of claim 11, in the method of transmitting video data according to any of claims 1 to 10, for each program comprising plural broadcast programs, it has been previously determined whether the video data included in each broadcast program in the program is either of a non-interlace scanning type or of an interlaced scanning type, and the information for identifying the scan method of the video data is given to each program.

According to a method of transmitting video data of claim 12, in the method of transmitting video data according to any of claims 1 to 10, for each program comprising plural broadcast programs, it has been previously determined whether the video data of each broadcast program included in the program is either of a non-interlace scanning type or of an interlaced scanning type, or whether the data of a non-interlace scanning type and that of an interlaced scanning type are mixed in program unit, and the information for identifying the scan method of video data is given to each program, and to each broadcast program.

According to a method of transmitting video data according to claim 13, in the method of transmitting video data of claim 12, only when the information for identifying the scan method of the video data, which is given to each program, indicates that the video data of a non-interlace scanning type and that of an interlaced scanning type are mixed in program unit, the information for identifying the scan method of the video data is given to each broadcast program included in each program.

A video data transmitting apparatus according to claim 14 which divides plural pieces of video data of plural broadcast programs into packets, respectively, and multiplexes and transmits the plural packets of the video data and packets including information about the broadcast programs, comprises: a multiplexing unit for multiplexing video data packets including the video data whose reproduction mode is non-interlace scanning and the video data whose reproduction mode is interlaced scanning, and packets including the information about the broadcast programs, which information includes the information for judging whether video data is of a non-interlace scanning type or of an interlaced scanning type; and a transmitting unit for transmitting the transmission data multiplexed by the multiplexing unit.

A video data reproducing apparatus according to claim 15 comprises: a receiving unit for receiving the information including at least non-interlace scanning type video data, interlaced scanning type video data, and information for judging whether video data is of a non-interlace scanning type or of an interlaced scanning type; a separating unit for extracting the video data which is selected by an operator and the identification data from the information input from the receiving unit; a program selecting unit for accepting the selection of video data by the operator and informing the separating unit of the video data to be extracted; an identification information storage unit for storing the identification data separated and extracted by the separating unit; a non-interlace scanning type decoding unit for decoding the non-interlace scanning type video data separated and extracted by the separating unit and outputting the same as a video signal; an interlaced scanning type decoding unit for decoding the interlaced scanning type video data separated and extracted by the separating unit and outputting the same as a video signal; and a scan instruction unit for judging the video scan method of the video data selected by the operator based on the information in the identification information storage unit, and giving decode instruction to the non-interlace scanning type video decoding unit for the non-interlace scanning type video data and to the interlaced scanning type video decoding unit for the interlaced scanning type video data.

According to a video data reproducing unit of claim 16, the video data reproducing unit of claim 15 further includes an output switching unit for receiving the respective video signals from the non-interlace scanning type video decoding unit and the interlaced scanning type video decoding unit and, selectively outputting the video signal from the non-interlace scanning type video decoding unit or that from the interlaced scanning type video decoding unit, on the basis of the instruction from the scanning instruction unit.

According to a video data reproducing unit of claim 17, in the video data reproducing unit of claim 16, the output switching unit directly outputs the signal from the non-interlace scanning type video decoding unit when the scan method instruction unit requests the output of the non-interlace scanning type video decoding unit, while it converts the signal from the interlaced scanning type video decoding unit to the non-interlace scanning type signal and outputs the converted signal when the scan method instruction unit requests the output of the interlaced scanning type video decoding unit.

According to a video data reproducing apparatus of claim 18, in the video data reproducing apparatus of claim 16, the output switching unit directly outputs the signal from the interlaced scanning type video decoding unit when the scan method instruction unit requests the output of the interlaced scanning type video decoding unit, while it converts the signal from the non-interlace scanning type video decoding unit to the interlaced scanning type one and outputting the converted signal when the scan method instruction unit requests the output of the non-interlace scanning type video decoding unit.

A video data reproducing apparatus of claim 19, which selects and reproduces one of plural broadcast programs transmitted by a method of transmitting video data wherein plural pieces of video data of plural broadcast programs including interlaced scanning type video data and non-interlace scanning type video data are multiplexed along with an event information table indicating the contents of the video data of each broadcast program in each time period, and the information for judging whether the video data of each broadcast program included in the event information table is of a non-interlace scanning type or of an interlaced scanning type to be transmitted, which further comprises a program guide forming means for forming a program guide showing the contents of each broadcast program in each time period and the scan method of the video data based on the event information table and the identification information and outputting the program guide on a display screen of a video display unit as visible information.

According to a video data reproducing unit of claim 20, in the video data reproducing unit of claim 19, the program guide forming means outputs the broadcast program information for non-interlace scanning type video data and the broadcast program information for interlaced scanning type video data separately in the form of separate tables, as visible information, on a display screen.

According to a video data reproducing unit of claim 21, in the video data reproducing unit of claim 19, the program guide forming means outputs the broadcast program information for non-interlace scanning type video data and the broadcast program information for interlaced scanning type video data together in tabular form, as visible information, on a display screen.

According to a video data reproducing apparatus of claim 22, the video data reproducing apparatus according to any of claims 19 to 21 has a capability of reproducing only interlaced scanning type video data, and further comprises a notification unit for notifying, as visible information or audible information, that video reproduction is impossible when a broadcast program whose video data is of a non-interlace scanning type is selected.

According to a video data reproducing apparatus of claim 23, the video data reproducing apparatus according to any of claims 19 to 21 has a capability of reproducing only non-interlace scanning type video data, and further comprises a notification unit for notifying, as visible information or audible information, that video reproduction is impossible when a broadcast program whose video data is of an interlaced scanning type is selected.

According to a video data reproducing apparatus of claim 24, the video data reproducing apparatus of claim 19 has a capability of reproducing only interlaced scanning type video data, and includes the program guide forming means outputting only a program guide about the broadcast program whose video data is of an interlaced scanning type.

According to a video data reproducing apparatus of claim 25, the video data reproducing apparatus of claim 19 has a capability of reproducing non-interlace scanning type video data, and includes the program guide forming means outputting only a program guide about the broadcast program whose video data is of a non-interlace scanning type.

BRIEF DESCRIPTION OF THE DRAWINGS

FIG. 4 is a diagram illustrating an example of assignment of the codes for identifying scan methods in the method of transmitting video data according to the above embodiment.

FIG. 5 is a diagram illustrating another example of assignment of the codes for identifying scan methods in the method of transmitting video data according to the above embodiment.

FIG. 9 is a diagram illustrating an example of an assignment of the non-interlace scanning type identification codes in the method of transmitting video data according to the above embodiment.

FIG. 10 is a diagram illustrating an example of an assignment of the interlaced scanning type of identification codes in the method of transmitting video data according to the above embodiment.

FIG. 11 is a diagram illustrating a structure of multiplexed data transmitted by a method of transmitting video data according to a third embodiment of the invention.

FIG. 12 is a diagram illustrating the structure of a NIT (Network Information Table) in the multiplexed data according to the above embodiment.

FIG. 13 is a diagram illustrating an example of an assignment of scan method identification codes in the method of transmitting video data according to the above embodiment.

FIG. 20 is a diagram illustrating an example of a program guide displayed on the display screen of the video data reproducing apparatus according to the above embodiment.

FIG. 21 is a diagram illustrating another example of the program guide displayed on the display screen of the video data reproducing apparatus according to the above embodiment.

FIG. 23 is a diagram illustrating the structure of a NIT (Network Information Table) included in the multiplexed data according to the above embodiment.

FIG. 24 is a diagram illustrating an example of the assignment of scan method identification codes in the method of transmitting video data according to the above embodiment.

FIG. 27 is a diagram illustrating an example of the assignment of scan method identification codes in the method of transmitting video data according to the above embodiment.

FIG. 31 is a diagram illustrating an example of program guide displayed on the display screen of a video data reproducing apparatus according to the first example of the prior art.

BEST MODE FOR CARRYING OUT THE INVENTION

Embodiment 1

A method of transmitting video data and a video data transmitting apparatus according to a first embodiment of the invention, enable to multiplex and transmit pieces of video data whose scan methods are different by adding identification information to a PMT (program map table) which is service information. A video data reproducing apparatus according to the first embodiment of the invention is capable of reproducing the resulting multiplexed data correctly.

Figure 1:
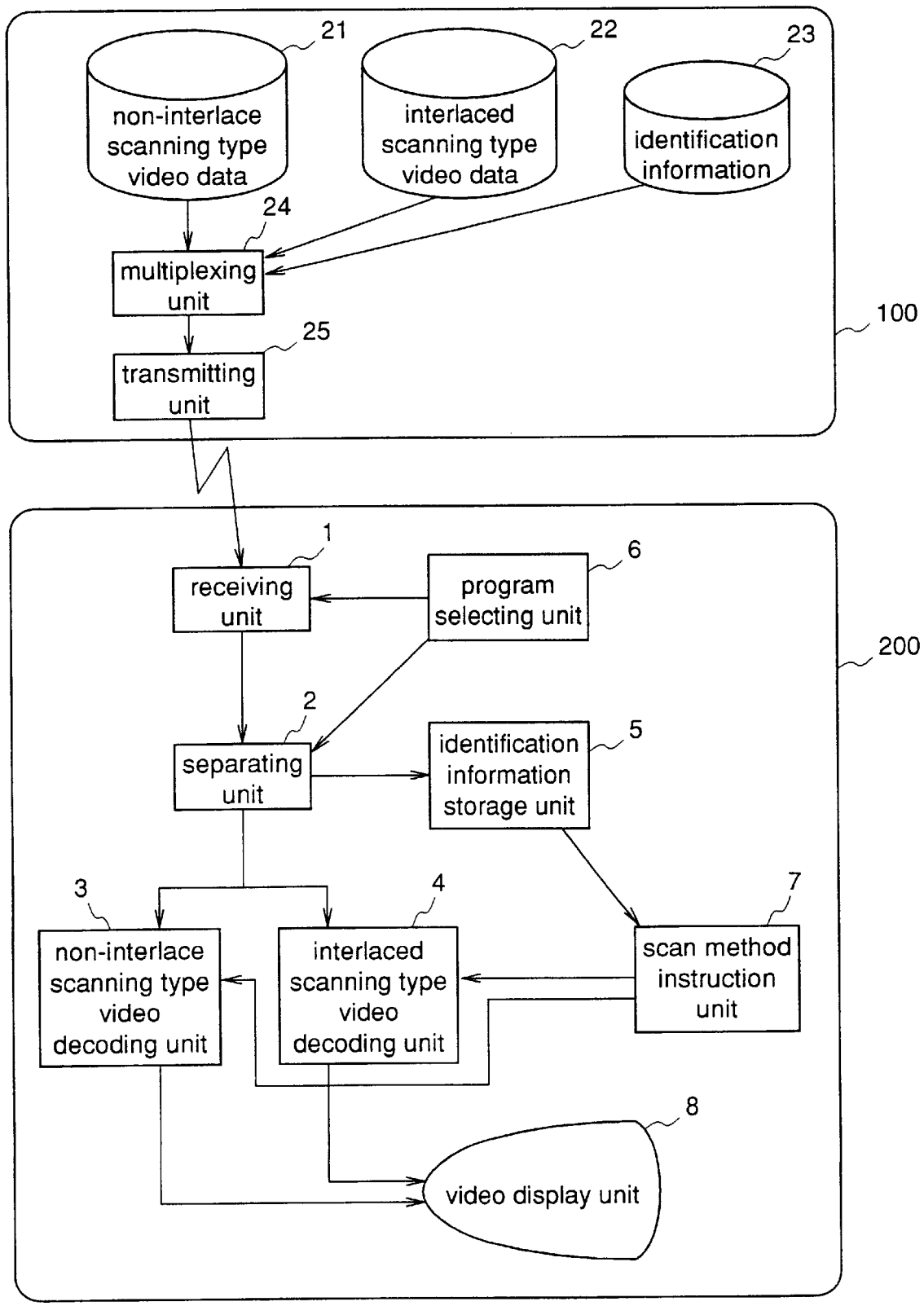
FIG. 1 is a diagram illustrating a video data transmitting apparatus and a video data reproducing apparatus according to a first embodiment of the invention.

FIG. 1 is a construction diagram illustrating the method of transmitting video data, the video data transmitting apparatus, and the video data reproducing apparatus according to the first embodiment of the invention. In the figure, the reference numerals shown in FIG. 30 designate same or corresponding parts.

Figure 30:
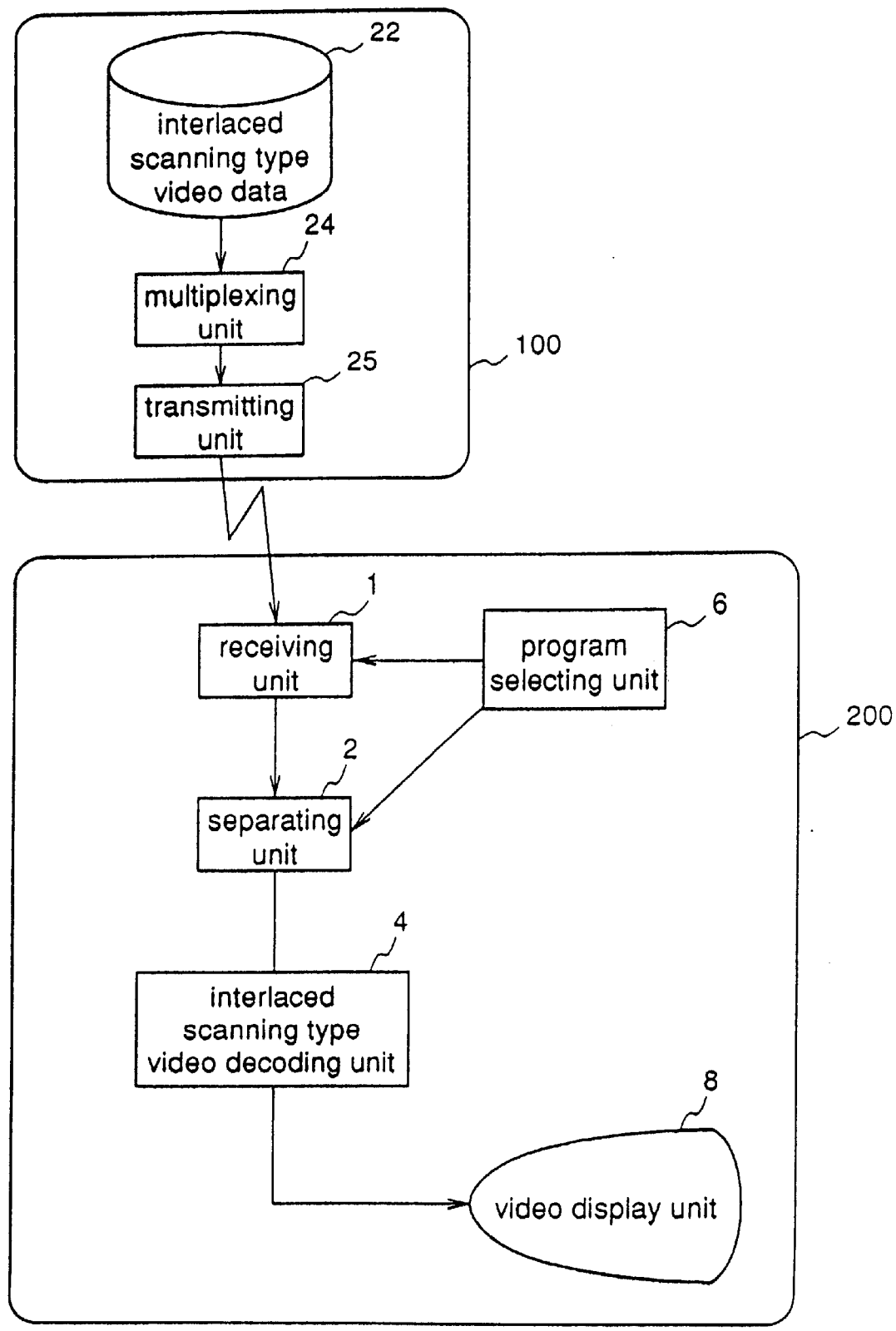
FIG. 30 is a diagram illustrating a video data transmitting apparatus and a video data reproducing apparatus according to the first example of the prior art.

As a difference between this and the prior art method shown in FIG. 30, initially described is a point that the transmitting apparatus 100 multiplexes and transmits not only interlaced scanning type video data but non-interlace scanning type video data and the identification information regarding the scan methods of the video data to be transmitted. Therefore, the video data transmitting apparatus according to the first embodiment further comprises a non-interlace scanning type video data storage unit 21 and an identification information storage unit 23, in addition to an interlaced scanning type video data storage unit 22.

Further in the first embodiment, the following units are added to the video data reproducing apparatus 200. Reference numeral 3 designates a non-interlace scanning type video decoding unit for decoding non-interlace scanning type video data and outputs it as a video signal. Numeral 5 designates an identification information storage unit which stores the information about whether the video data is of an interlaced scanning type or of a non-interlace scanning type. Numeral 7 designates a scan method instruction unit for giving reproduce instruction to the non-interlace scanning type video decoding unit 3 or the interlaced scanning type video decoding unit 4, on the basis of the information from the identification information storage unit 5.

Figure 2:
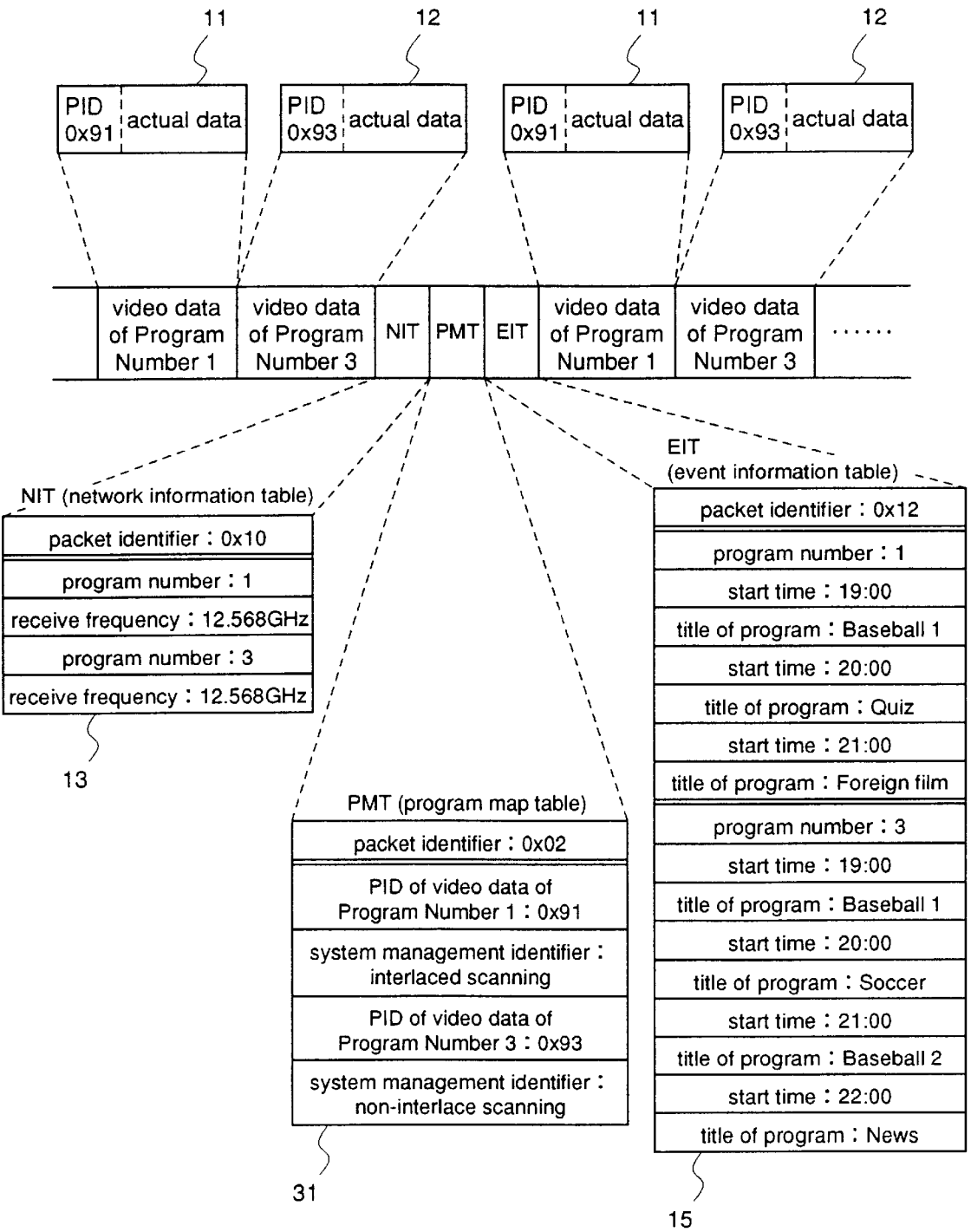
FIG. 2 is a diagram illustrating a data structure of multiplexed data which is transmitted by a method of transmitting video data according to the above embodiment.

FIG. 2 is a diagram illustrating the structure of transmission data in the method of transmitting video data according to the first embodiment. The difference between this and the data structure of the transmission data in the prior art transmission method shown in FIG. 29 resides in that a system management identifier for judging whether video data is a broadcast program or a non broadcast program can be described in the PMT (program map table) 31 and the identifier includes a code for judging whether video data is of a non-interlace scanning type or of an interlaced scanning type.

Figure 3:
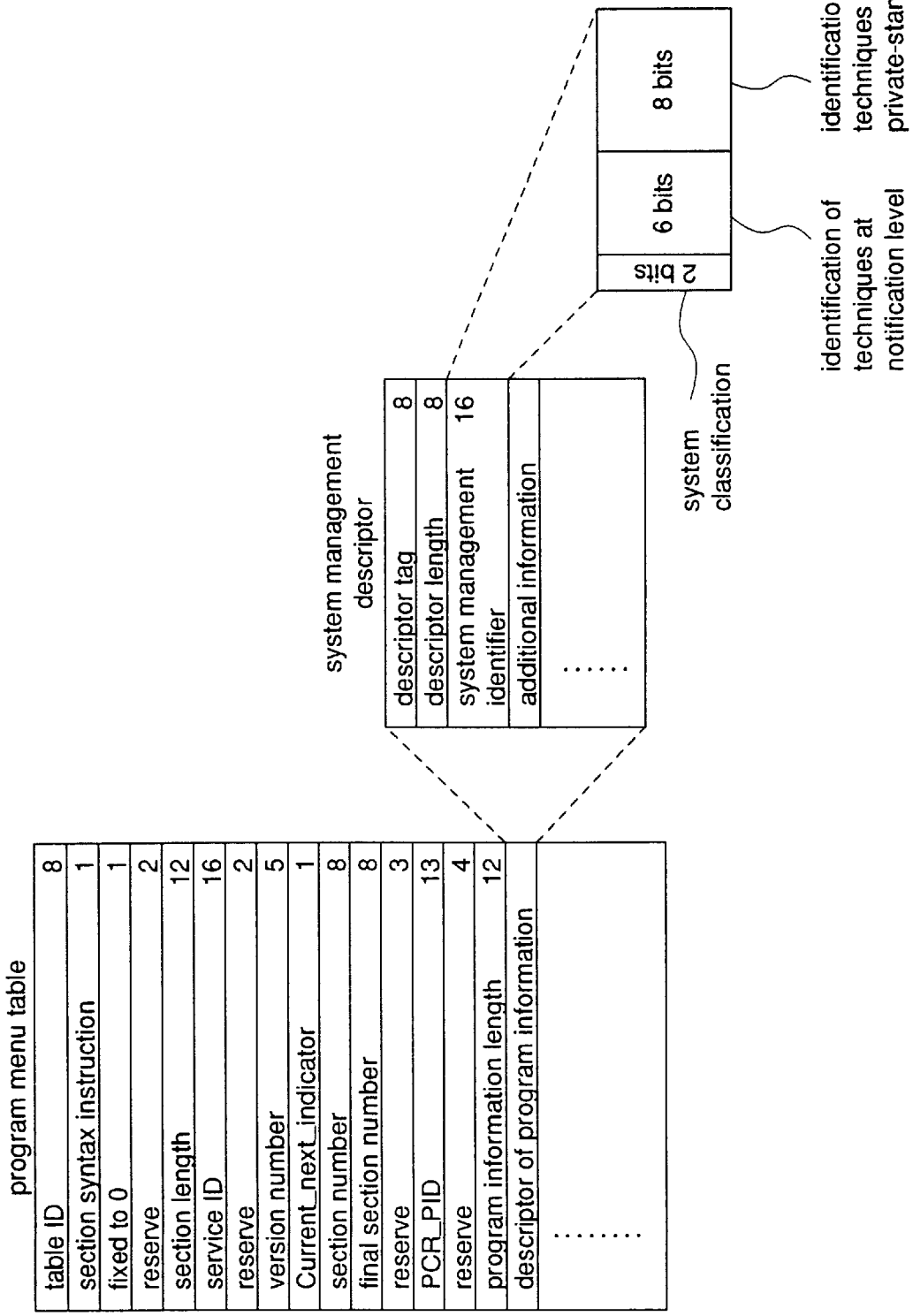
FIG. 3 is a diagram illustrating the structure of a PMT (program map table) in the multiplexed data according to the above embodiment.

FIG. 3 is a diagram illustrating the data structure of the PMT (program map table) 31. As shown in the figure, the system management identifier is included in a program information descriptor in the PMT and comprises 16 bits. Of the 16 bits, the higher order two bits are currently used for system classification, the middle order six bits for identifying techniques at notification level, and the lower order eight bits for identifying private-standard techniques which can be decided by private enterprises. The system classification by the higher order two bits is used for displaying whether the information of the bits lower than these higher order bits are the information available for every user or the business application information or the like. Therefore, it is possible to assign the codes indicating scan methods to the lower order eight bits and the middle order six bits, respectively, as shown in FIGS. 4 and 5.

FIG. 4 is a diagram illustrating an example of a code assignment to the lower order eight bits of the system management identifier. Here it is assumed that the code indicating interlaced scanning is 0x01 and the code indicating non-interlace scanning is 0x02. This is just an example of code assignment and any code can be applied as long as it can indicate non-interlace scanning or interlaced scanning.

FIG. 5 is a diagram illustrating an example of code assignment to the middle six bits of the system management identifier. Although in the figure it is assumed that the code indicating interlaced scanning is 1 and the code indicating non-interlace scanning is 2, the assigned codes are not limited to the above-described ones.

Figure 6:
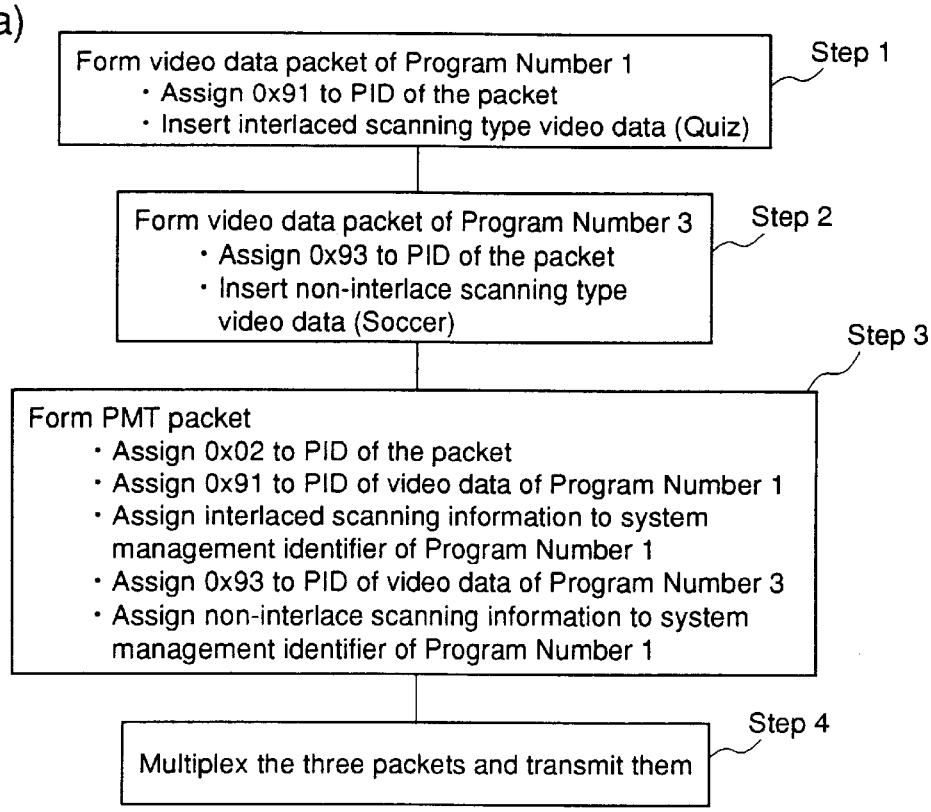
FIGS. 6(a) and 6(b) are flowcharts for explaining the operation of the video data transmitting apparatus and video data reproducing apparatus according to the above embodiment.
Figure 6:
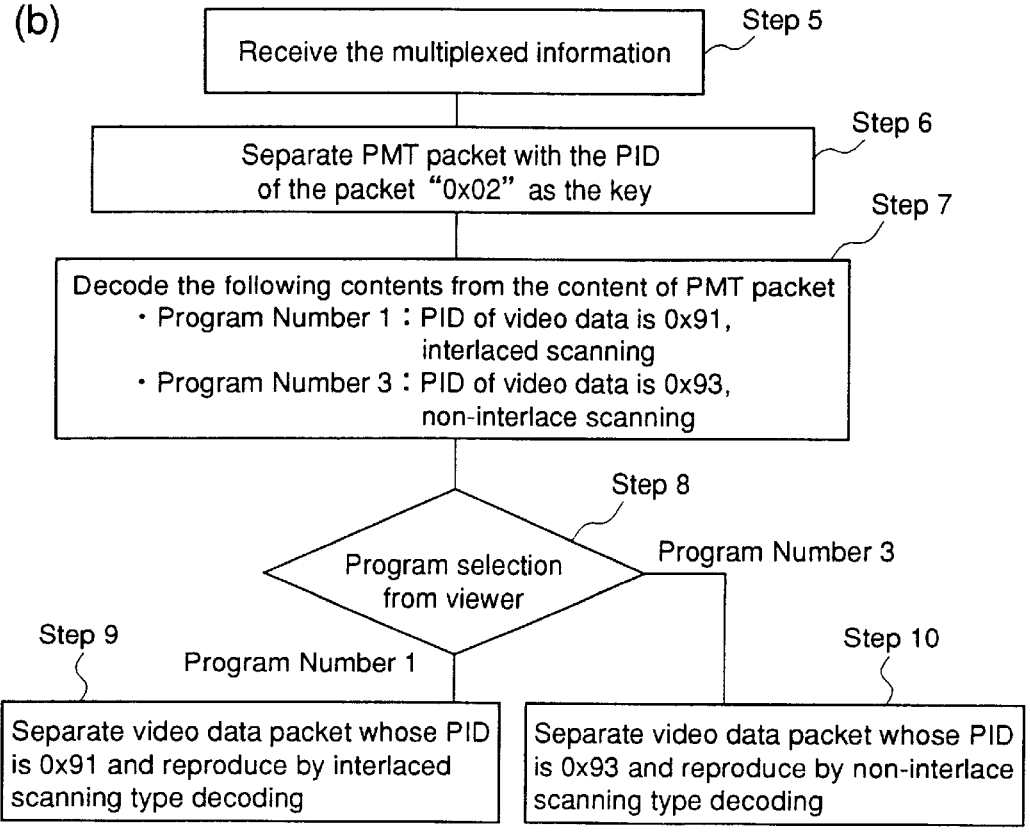

Hereinafter a description is given of the operation of the video data transmitting apparatus and video data reproducing apparatus according to the first embodiment configured above, with reference to the flowcharts of FIGS. 6. FIG. 6(*a*) is a flowchart of the procedure by the video data transmitting apparatus according to the first embodiment, FIG. 6(*b*) is a flowchart of the procedure of the video data receiving unit (video data reproducing apparatus).

To simplify the description, we focus attention on a specified time period and assume that two broadcast programs of Program Number 1 and Program Number 3 are transmitted during the period. Further it is assumed that the two broadcast programs are multiplexed within a frequency band and then transmitted. The broadcast program of Program Number 1 is of an interlaced scanning type and the title thereof is "Quiz", and the broadcast program of Program Number 3 is of a non-interlace scanning type and the title thereof is "Soccer".

In the transmitting apparatus 100, the following procedure is executed as shown in the flow of FIG. 6(*a*).

Initially, in step 1, a packet of the video data of Program Number 1 is formed. More specifically, 0x91 is assigned as a packet identifier PID to the header of the packet and, following the PID, the video data "Quiz" is inserted which has been obtained from the interlaced scanning type video data storage unit 22, to form a packet of a prescribed size. More specifically, the data larger than a prescribed size is divided into a plurality of packets, and for the data smaller than the prescribed size, vacant data (normally zero data) is inserted to adjust all the packets to the prescribed size. Although the PID used here is 0x91, any PID except for 0x91 is applicable as long as it is selected and given in such a way that the selected packet can be distinguished from the other packets.

Next, in step 2, a packet of the video data of Program Number 3 is formed as in step 1. 0x93 is assigned as a packet identifier PID to the header of the packet, and then the video data "Soccer" is inserted which has been obtained from the non-interlace scanning type video data storage unit 21, to form the packet of a prescribed size. The PID is not limited to this example as in step 1.

Next, step 3 is executed to form a PMT packet. More specifically, 0x02 is assigned as the packet identifier PID to the header of the packet; 0x91 is assigned to the PID of the video data of Program Number 1; 0x01 is assigned, as the identification information indicating interlaced scanning, to a region comprising the lower order eight bits (0x01 indicates interlaced scanning); 0x93 is assigned to the PID of the video data of Program Number 3; and 0x02 is assigned, as the identification information indicating non-interlace scanning, to the lower order eight bits of the system management identifier (0x02 indicates non-interlace scanning). In place of the lower order eight bits of the system management identifier used here (see FIG. 4), the middle order six bits shown in FIG. 5 may be used as identification information. Further, although in this description the packet identifier PID of the PMT packet is defined as 0x02, the PID of the PAT (Program Association Table) as service information may be defined in the case based on MPEG standard.

Other service information packets are also formed as necessary. Then, in step 4, the multiplexing unit 24 adjusts each of the formed packets to a prescribed size, outputs the packets multiplexed to the transmitting unit 25 which transmits the packets. Normally, error correction is added and QPSK modulation and QAM modulations or the like are performed before the transmission, but this is not the key point of the present invention and therefore a detailed description thereof will be omitted.

As described above, multiplexed data is transmitted through a transmission line to the receiving unit 200 which receives the multiplexed data. In the receiving end, the following procedure is performed (see FIG. 6(*b*)).

Initially, in step 5, the receiving unit 1 receives the transmitted, multiplexed data. Then, in step 6, the separating unit 2 separates the PMT packet from the received data and extracts it, with the packet identifier PID 0x02 as the key.

In step 7, the data of the PMT obtained by the extraction in step 6 is decoded to obtain the following information: "Program Number 1: the PID of the video data is 0x91, interlaced scanning" and "Program Number 3: the PID of the video data is 0x93, non-interlace scanning", and stores the information in the identification information storage unit 5.

Then, in step 8, the program selecting unit 6 accepts program selection from viewer through the medium of remote controller, channel buttons on a monitor or the like.

When a viewer selects Program Number 1 in step 8, step 9 is executed in which, according to the information obtained from the identification information storage unit 5, the program selecting unit 6 recognizes that the PID of the video data to be reproduced is 0x91 and the scan method for the data is interlaced scanning. The program selecting unit 6 instructs the separating unit 2 to separate a packet whose PID is 0x91, and the scan method instruction unit 7 gives decode instruction to the interlaced scanning type decoding unit 4.

On the other hand, when the viewer selects Program Number 3 in step 8, step 10 is executed. As in step 9, the program selecting unit 6 recognizes that the PID of the video data is 0x93 and the scan method for the data is non-interlace scanning, and instructs the separating unit 2 to separate a packet whose PID is 0x93, and the scan method instruction unit 7 gives decode instruction to the non-interlace scanning type decoding unit 3.

In either case, decoding processing is performed in the interlaced scanning type decoding unit 4 in step 9 or in the non-interlace scanning type decoding unit 3 in step 10, and the resultant decoded video signal is input to the video display unit 8 and reproduced on the screen.

As described above, in the method of transmitting video data according to the first embodiment wherein plural pieces of video data of plural broadcast programs are divided into packets, respectively, and the plural packets of the data and packets including the information about the broadcast programs are multiplexed and transmitted, both the video data whose reproduction mode is interlaced scanning and the video data whose reproduction mode is non-interlace scanning are transmitted as the pieces of video data of plural broadcast programs, and the information for judging whether the video data of a broadcast program is of an interlaced scanning type or of a non-interlace scanning type is transmitted, which information is described in a PMT (program map table) 31 indicating through which packet a broadcast program is transmitted, whereby the interlaced scanning type video data and the non-interlace scanning type video data are transmitted so that the data of each of these scan methods is reproduced correctly at the receiving end, and the video data of each of the scan methods can be processed on a broadcast program basis in contrast to the prior art method which is almost exclusive to the interlaced scanning type video data, thereby improving degree of freedom in programing of the broadcast programs to be transmitted.

Further, the video data transmitting apparatus according to the first embodiment comprises: the storage units 21 and 22 storing non-interlace scanning type video data and interlaced scanning type video data, respectively; the storage unit 23 for storing the information for forming service information about the video data or the like; the multiplexing unit 24 for forming and multiplexing video data packets and packets including the service information; and a transmitting unit 25 for transmitting the multiplexed data, whereby the apparatus enables to execute the above-described video transmission method and obtain the above-described effects.

Furthermore, the video data reproducing apparatus according to the first embodiment comprises: the receiving unit 1 for receiving the information including at least non-interlace scanning type video data, interlaced scanning type video data, and identification data for judging whether the video data is of a non-interlace scanning type or of an interlaced scanning type; the separating unit 2 for extracting the video data selected by an operator from the information input from the receiving unit 1 and the identification information thereof; the program selecting unit 6 for accepting selection of video data from the operator and informing the separating unit 2 of the video data to be extracted; the identification information storage unit 5 for storing the identification data separated and extracted by the separating unit 2; the non-interlace scanning type video decoding unit 3 for decoding the non-interlace scanning type video data separated and extracted by the separating unit 2 and outputting it as a video signal; the interlaced scanning type video decoding unit 4 for decoding the interlaced scanning type video data separated and extracted by the separating unit 2 and outputting it as a video signal; the scan method instruction unit 7 for identifying the scan method of the video data selected by the operator according to the information from the identification information storage unit 5, giving decode instruction to the non-interlace scanning type video decoding unit 3 when the selected video data is of a non-interlace scanning type, and to the interlaced scanning type video decoding unit 4 when the selected video data is of an interlaced scanning type, whereby it is possible to reproduce both interlaced scanning type video data and non-interlace scanning type video data correctly and display them.

Embodiment 2

A method of transmitting video data and a video data transmitting apparatus according to a second embodiment of the invention enable to multiplex and transmit pieces of video data of different scan methods by adding identification information to an EIT (event information table) which is service information, and a video data reproducing apparatus according to the second embodiment of the invention is capable of reproducing the resulting multiplexed data correctly.

Figure 7:
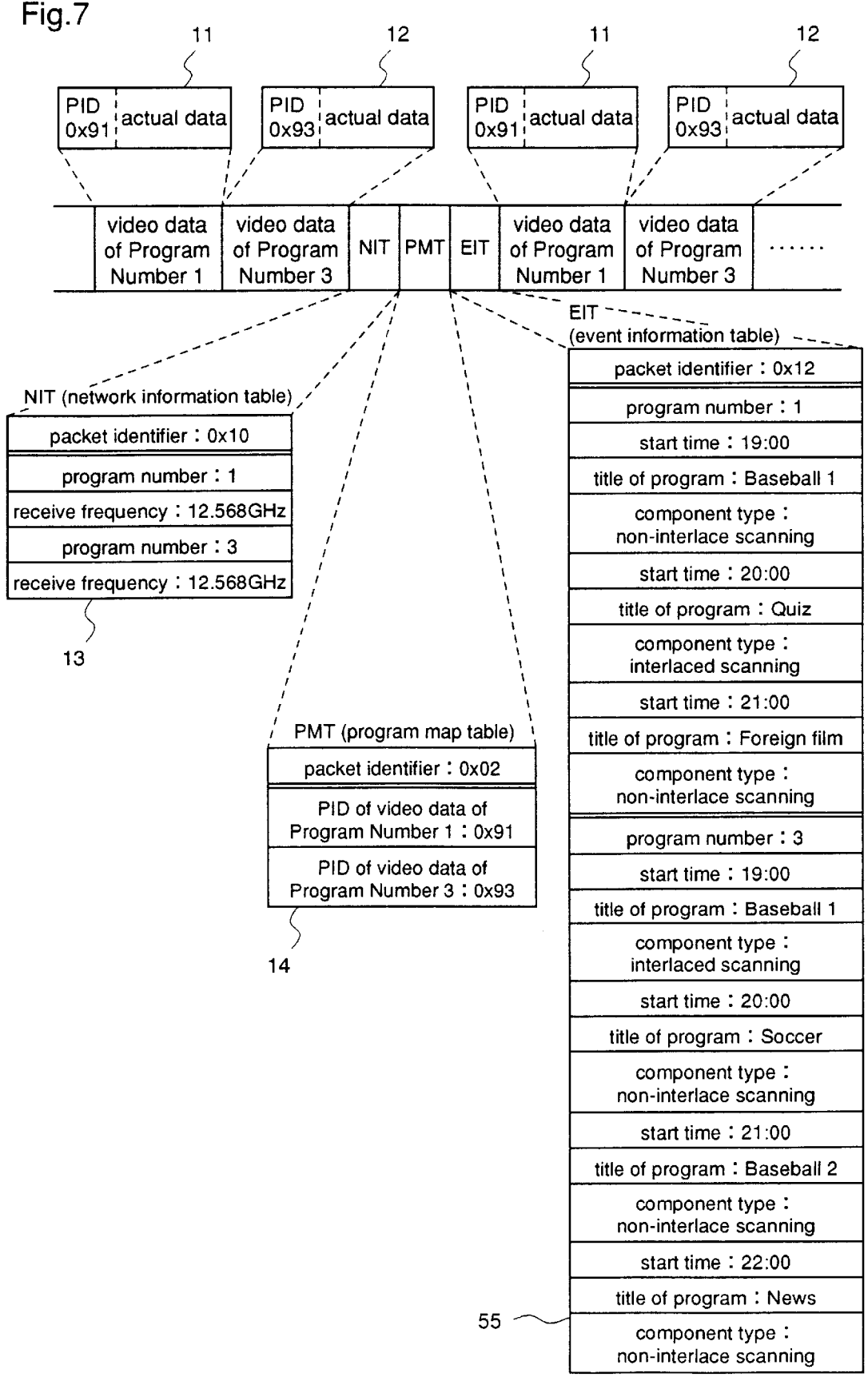
FIG. 7 is a diagram illustrating a structure of multiplexed data transmitted by a method of transmitting video data according to a second embodiment of the invention.
Figure 29:
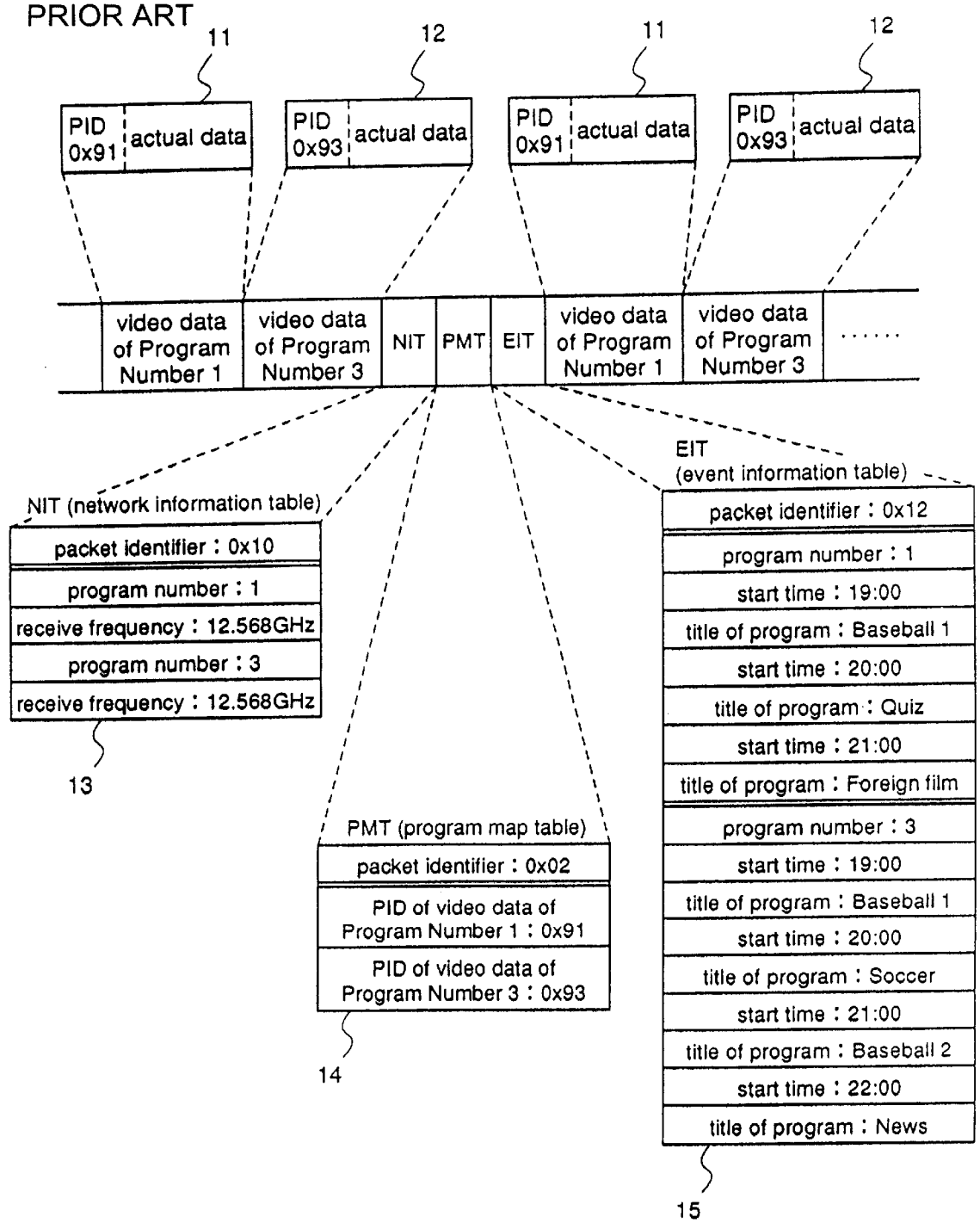
FIG. 29 is a diagram illustrating a structure of multiplexed data transmitted by a method of transmitting video data according to a first example of prior art.

FIG. 7 is a diagram illustrating the data structure of transmission data in the method of transmitting video data according to the second embodiment of the invention. The difference between this and the transmission data in the prior art method shown in FIG. 29 is that component type indicating what component a broadcast program includes can be described in an EIT (event information table) 55, and the component type includes a code for judging whether video data is of a non-interlace scanning type or of an interlaced scanning type.

Figure 8:
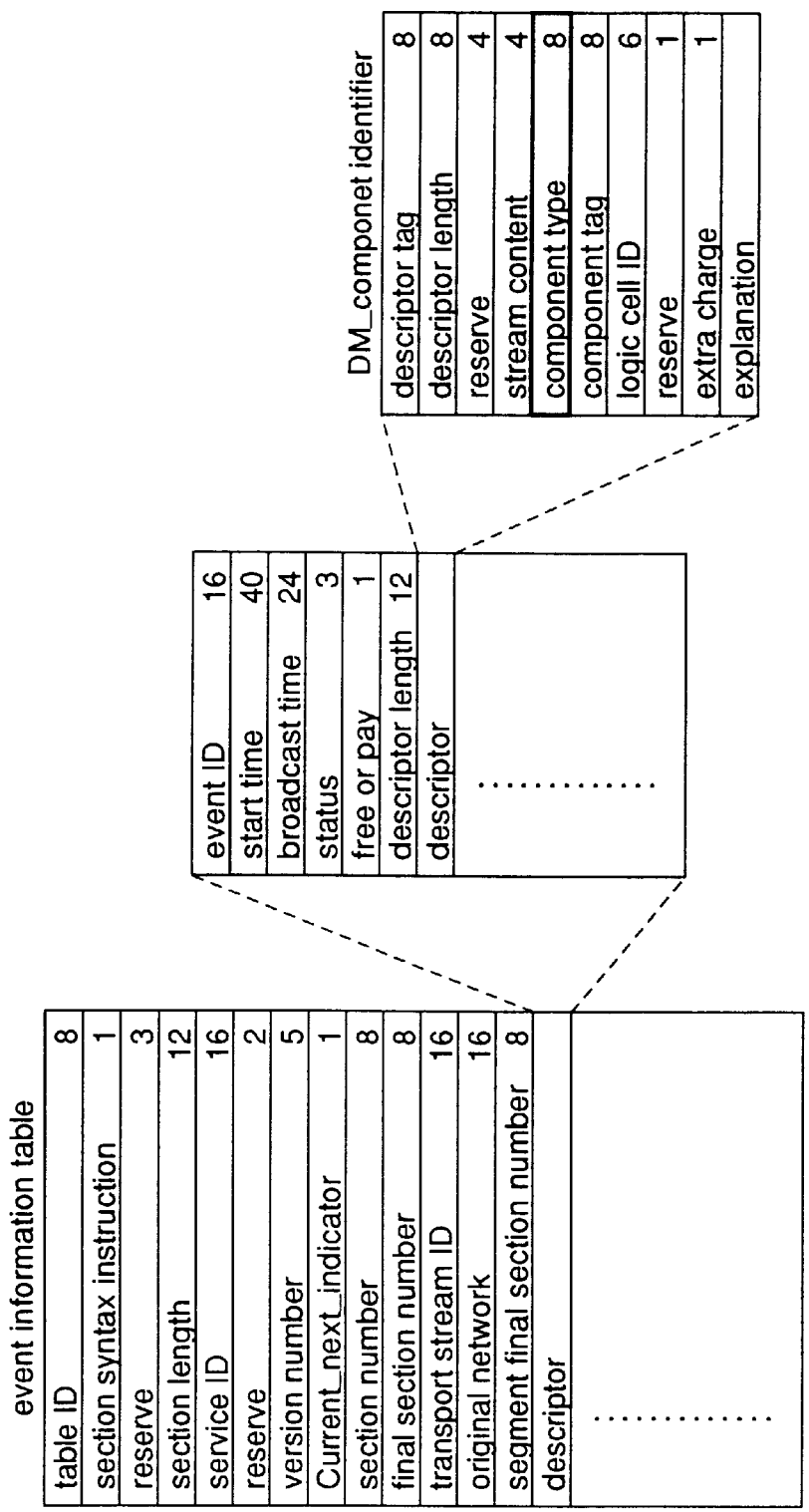
FIG. 8 is a diagram illustrating the structure of an EIT (Event Information Table) in the multiplexed data according to the above embodiment.

FIG. 8 is a diagram illustrating the data structure of the EIT (event information table) and, as shown in the figure, the component type is included in DM_component identifier as one of the descriptors in the event information table and comprises 8 bits.

FIG. 9 is a diagram illustrating an exemplary code assignment to non-interlace scanning type component type, and FIG. 10 is a diagram illustrating an exemplary code assignment to interlaced scanning type component type. As shown in the figures, these code assignments to the component types allow the information about scan methods to be transmitted along with the information about aspect ratio which indicates a length-to-width ratio of frame and the information about whether data is a moving picture or a still picture. By receiving the transmitted information, the reproducing apparatus can know that the data is of a non-interlace scanning type when the given code is among 0x21 to 0x34 and that the data is of an interlaced scanning type when the given code is among 0x01 to 0x14.

Further, as in the first embodiment, the code assignment is not limited to those shown in FIGS. 9 and 10 and the code system to which the other information is added is applicable as long as the difference in scan methods can be recognized.

The video data transmitting apparatus and video data reproducing apparatus according to the second embodiment have the same configurations as those according to the first embodiment, and thus FIG. 1 is used for the explanation.

Next, a description is given of the operations of the video data transmitting apparatus 100 and the video data reproducing apparatus 200 according to the second embodiment.

In the transmitting apparatus 100, as in the first embodiment, packets of the video data of Program Number 1 and that of Program Number 3 are formed. Each of plural broadcast programs included in Program Number 1 may be treated as video data of any scan method. This can be applied for Program Number 3.

Here assume that the packet of Program Number 1 comprises: "Baseball 1" obtained from the non-interlace scanning type video data storage unit 21; "Quiz" obtained from the interlaced scanning type video data storage unit 22; and "Foreign film" obtained from the non-interlace scanning type video data storage unit 21. Also assume that the packet of Program Number 3 comprises: "Baseball 1" (interlaced scanning); "Soccer" (non-interlace scanning); "Baseball 2" (non-interlace scanning); and "News" (non-interlace scanning).

Next, service information packets are formed, but here described is the formation of the EIT packet only. Initially, 0x12 is assigned as the PID which is the header of the EIT, and the following data is stored in the EIT as the information relative to Program Number 1:

start time: 19:00 title of program: Baseball 1 component type: 0x21 (code indicating non-interlace scanning)

start time: 20:00 title of program: Quiz component type: 0x01 (code indicating interlaced scanning)

start time: 21:00 title of program: Foreign film component type: 0x21 (code indicating non-interlace scanning)

Next, the following data is stored in the EIT as the information relative to Program Number 3.

start time: 19:00 title of program: Baseball 1 component type: 0x01 (code indicating interlaced scanning)

start time: 20:00 title of program: Soccer component type: 0x21 (code indicating non-interlace scanning)

start time: 21:00 title of program: Baseball 2 component type: 0x21 (code indicating non-interlace scanning)

start time: 21:00 title of program: News component type: 0x21 (code indicating non-interlace scanning)

Thereafter, this EIT packet and the other service information packets including the PMT describing the video data of Program Number 1, the video data of Program Number 3, and the PIDs of the video data of each Program Number are multiplexed by the multiplexing unit 24 to obtain multiplexed data. The resultant multiplexed data is transmitted from the transmitting unit 25.

The procedure in which the video data reproducing apparatus 200 receives the transmitted data as shown in FIG. 7 and performs reproduction operation is as follows.

The receiving unit 1 receives the transmitted multiplexed data, and the separating unit 2 separates and extracts the PMT packet with the packet identifier PID 0x02 as the key, and the EIT packet with the packet identifier PID 0x12 as the key.

Then, the data of the PMT is decoded to obtain the information: "the PID of the video data of Program Number 1 is 0x91" and "the PID of the video data of Program Number 3 is 0x93", and the data of the EIT is decoded to obtain the information, e.g., "the scan method for the video data of Program Number 1 is interlaced scanning" and "the scan method for the video data of Program Number 3 is non-interlace scanning" when the current time is within a range from 20:00 to 21:00, and the obtained information is stored in the identification information storage unit 5.

Then, program selection from viewer is accepted through the medium of a remote controller, channel buttons of a monitor or the like and, when a viewer selects Program Number 1, it is recognized based on the information from the identification information storage unit 5 that the PID of the video data to be reproduced is 0x91 and the scan method for the data is interlaced scanning. The program selecting unit 6 instructs the separating unit 2 to separate a packet whose PID is 0x91, and the scan method instruction unit 7 gives decode instruction to the interlaced scanning type decoding unit 4.

On the other hand, when the viewer selects Program Number 3, it is recognized based on the information from the identification information storage unit 5 that the PID of the video data is 0x93 and the scan method for the data is non-interlace scanning. The program selecting unit 6 instructs the separating unit 2 to separate a packet whose PID is 0x93 and the scan method instruction unit 7 gives decode instruction to the non-interlace scanning type decoding unit 3.

As described above, in the method of transmitting video data according to the second embodiment wherein plural pieces of video data of plural broadcast programs are divided in packets, respectively, and the plural packets of the pieces of video data and packets including the information about the broadcast programs are multiplexed and transmitted, the video data whose reproduction mode is non-interlace scanning and the video data whose reproduction mode is interlaced scanning are transmitted as the pieces of video data of plural broadcast programs, and the information for judging whether the video data of a broadcast program is of a non-interlace scanning type or of an interlaced scanning type is transmitted, which information is described in the event information table 55 showing the contents of the video data of a broadcast program, whereby both interlaced scanning type video data and non-interlace scanning type video data can be transmitted so that the data of each of these scan methods is reproduced correctly at the receiving end, and pieces of video data of different scan methods can be processed on a broadcast program basis, resulting in improved degree of freedom in programing of broadcast programs to be transmitted.

Further, the video data transmitting apparatus according to the second embodiment which has the same configuration as that of the first embodiment can realize the above-described transmission method and obtain the aforesaid effects.

Furthermore, the video data reproducing apparatus according to the second embodiment which has the same configuration as that of the first embodiment can correctly reproduce, on a broadcast program basis, both the non-interlace scanning type video data and the interlaced scanning type video data among the multiplexed data transmitted by the foregoing transmission method and display them.

Embodiment 3

A method of transmitting video data and a video data transmitting apparatus according to a third embodiment of the invention can multiplex and transmit pieces of video data of different scan methods by adding identification information to an NIT (network information table) which is service information, and a video data reproducing apparatus according to the third embodiment is capable of reproducing the resulting multiplexed data correctly.

FIG. 11 is a diagram illustrating the data structure of transmission data in the method of transmitting video data according to the third embodiment of the invention. The difference between this and the transmission data in the prior art method shown in FIG. 29 is that network ID for identifying network can be described in a NIT (network information table) 63, and the network ID includes a code for judging whether video data is of a non-interlace scanning type or of an interlaced scanning type.

FIG. 12 is a diagram illustrating the data structure of the network information table indicating the presence of the network ID. FIG. 13 is a diagram illustrating an example of code assignment to network ID. Now assume that a code indicating interlaced scanning is 0x0001 and a code indicating non-interlace scanning is 0x0002. As in the first embodiment, the code assignment is not limited to this example.

The video data transmitting apparatus and video data reproducing apparatus according to the third embodiment have the same configuration as those according to the first embodiment and thus FIG. 1 is used for the description.

Next, a description is given of the operations of the video data transmitting apparatus 100 and the video data reproducing apparatus 200 according to the third embodiment.

In the transmitting apparatus 100, video data of each broadcast program included in Program Number 1 and video data of each broadcast program included in Program Number 3 are obtained from the non-interlace scanning type storage unit and the interlaced scanning type storage unit, respectively, and video data packets of the respective programs are formed. In the same method performed in the first embodiment, the packets to which PIDs are given are formed.

Next, service information packets are formed. Here a description is given of the formation of NIT packet. Initially, 0x10 is assigned as PID which is the header of the NIT packet. Then, the following data is stored in the NIT as the information about Program Number 1.

network ID: 0x0002 (code indicating non-interlace scanning)
    program number: 1
    receive frequency: 12.568 GHz Next, the following data is stored in the NIT as the information about Program Number 3.

network ID: 0x001 (code indicating interlaced scanning)
    program number: 3
    receive frequency: 12.568 GHz Thereafter, the service information packets including the NIT, and the video data packets of Program Number 1 and Program Number 3 are multiplexed by the multiplexing unit 24, and the resultant multiplexed data is transmitted from the transmitting unit 25.

Further, the procedure in which the video data reproducing apparatus 200 receives the transmitted data shown in FIG. 11 and performs reproduction operation is as follows.

Initially, the receiving unit 1 receives the multiplexed data transmitted and the separating unit 2 separates and extracts the PMT packet with the packet identifier PID 0x02 as the key, the NIT packet with the packet identifier PID 0x10 as the key.

Then, the data of the PMT is decoded to obtain the information: "the PID of the video data of Program Number 1 is 0x91" and "the PID of the video data of Program Number 3 is 0x93", and the data of the NIT is decoded to obtain the information: "the scan method for the video data of Program Number 1 is non-interlace scanning" and "the scan method for the video data of Program Number 3 is interlaced scanning", and such information is stored in the identification information storage unit 5.

Subsequently, program selection from viewer is accepted through the medium of a remote controller, channel buttons of a monitor, or the like. When a viewer selects Program Number 1, it is recognized based on the information from the identification information storage unit 5 that the PID of the video data to be reproduced is 0x91 and the scan method for the data is non-interlace scanning. The program selecting unit 6 instructs the separating unit 2 to separate a packet whose PID is 0x91 and the scan method instruction unit 7 gives decode instruction to the non-interlace scanning type decoding unit 3. On the other hand, when the viewer selects Program Number 3, it is recognized based on the information from the identification information storage unit 5 that the PID of the video data is 0x93 and the scan method for the data is interlaced scanning. The program selecting unit 6 instructs the separating unit 2 to separate a packet whose PID is 0x93, and the scan method instruction unit 7 gives decode instruction to the interlaced scanning type decoding unit 4.

As described above, in the method of transmitting video data according to the third embodiment wherein plural pieces of video data of plural broadcast programs are divided into packets, respectively, and the plural packets of the video data and packets including the information about the broadcast programs are multiplexed and transmitted, video data whose reproduction mode is non-interlace scanning and video data whose reproduction mode is interlaced scanning are transmitted as the pieces of video data of plural broadcast programs and the information for judging whether the video data of a broadcast program is of a non-interlace scanning type or of an interlaced scanning type is transmitted, which information is described in the network information table 63 showing through which channel a broadcast program is transmitted, whereby interlaced scanning type video data and non-interlace scanning type video data can be transmitted such that the video data of each of these scan methods are reproduced correctly, resulting in improved degree of freedom in programing of broadcast programs to be transmitted.

Further, the video data transmitting apparatus according to the third embodiment configured as in the first embodiment can realize the aforesaid transmission method and obtain the above-described effects.

Furthermore, the video data reproducing apparatus according to the third embodiment configured as in the first embodiment can reproduce both non-interlace scanning type video data and interlaced scanning type video data in the multiplexed data transmitted by the foregoing transmission method correctly and display them.

Embodiment 4

A video data reproducing apparatus according to a fourth embodiment of the invention can selectively output video signals subjected to decoding processing of different scanning types.

Figure 14:
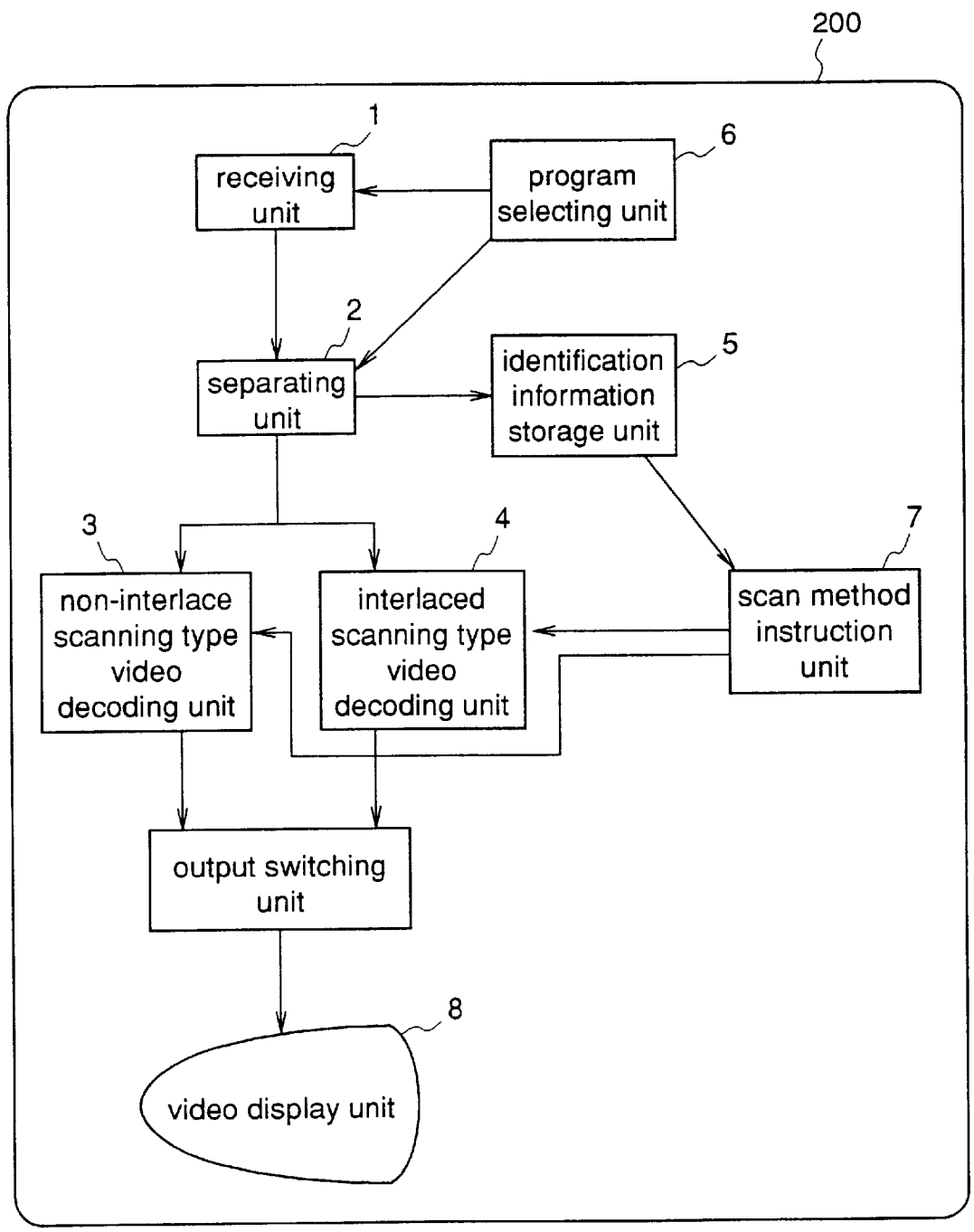
FIG. 14 is a diagram illustrating a configuration of a video data reproducing apparatus according to a fourth embodiment of the invention.

FIG. 14 is a block diagram of a video data reproducing apparatus according to the fourth embodiment of the invention. The difference between this and the video data reproducing apparatus of the first embodiment shown in FIG. 1 is that an output switching unit 81 is added which receives video signals from the non-interlace scanning type decoding unit 3 and the interlaced scanning type decoding unit 4 and selectively outputs those video signals according to the instruction from the scan method instruction unit 7.

In the video data reproducing unit 200 of the fourth embodiment, the multiplexed data as shown in the first embodiment is received and, as in the first embodiment, the information about scan method transmitted in the PMT (program map table) as a service information packet is separated and extracted by the separating unit 2 and stored in the identification information storage unit 5.

Figure 15:
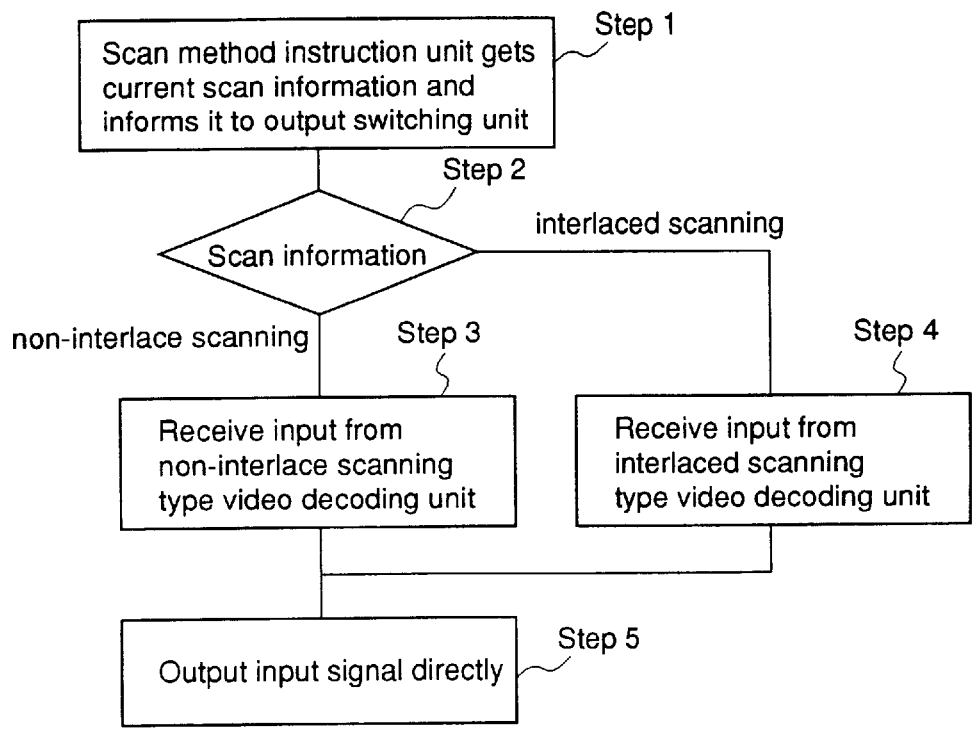
FIG. 15 is a diagram illustrating the operation of the video data reproducing apparatus according to the above embodiment.

In this apparatus of the fourth embodiment, the output switching unit 81 performs switching operation based on the stored information. FIG. 15 is a flowchart mainly illustrating the operation of the output switching unit 81 according to the fourth embodiment. Hereinafter a description is given with reference to FIG. 15.

First of all, in step 1, the scan method instruction unit 7 obtains scan information from the identification information storage unit 5, and offers the output switching unit 81 the information for non-interlace scanning when the scan information indicates non-interlace scanning, or the information for interlaced scanning when the obtained scan information indicates interlaced scanning.

When it is found from the judgment in step 2 that the obtained information indicates non-interlace scanning, step 3 is executed and the output switching unit 81 receives the input from the non-interlace scanning type video decoding unit 3. When it is found from the judgment in step 2 that the obtained information indicates interlaced scanning, step 4 is executed instead of step 3 and the output switching unit 81 receives the input from the interlaced scanning type video decoding unit 4. When either step 3 or step 4 is executed, the output switching unit 81 outputs the input video signals to the video display unit 8 where the display is performed.

In the reproducing apparatus of the fourth embodiment configured to perform the above operation, a signal of a non-interlace scanning type or of an interlaced scanning type is output through a signal line to the video display unit 8. Therefore, this apparatus is effective in the case where a monitor, that is, a video display unit 8 can be used to output a video signal applied from a common terminal as a video image, whether the video signal is of a non-interlace scanning or of an interlaced scanning.

However, the monitor not having such capability may be used as the video display unit 8 in the reproducing apparatus of the fourth embodiment in the following applications.

The first application example is that the monitor corresponding to interlaced scanning only is used as the video display unit 8, and the configuration of the video data reproducing apparatus used in this application example is equal to the configuration shown in FIG. 14 although the output switching unit 81 operates differently.

Figure 16:
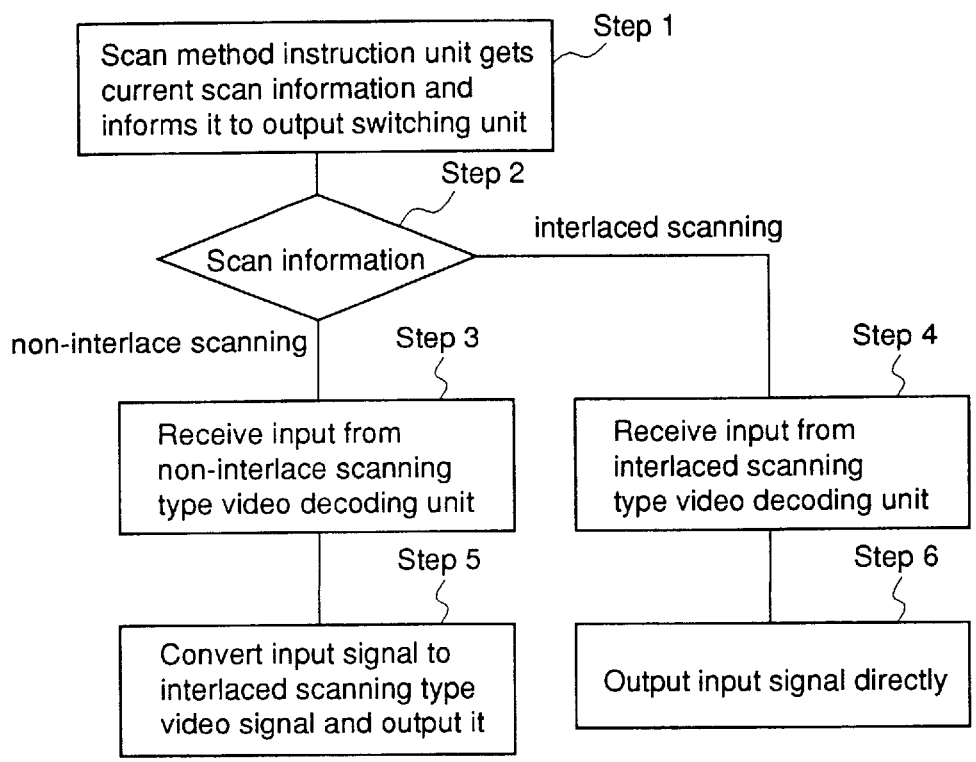
FIG. 16 is a flowchart for explaining the operation of the first application example of the video data reproducing apparatus according to the above embodiment.

FIG. 16 is a flowchart illustrating the operation of the first application example of the video data reproducing apparatus according to the fourth embodiment. Hereinafter a description is given of the operation of the first application example with reference to the flow of FIG. 16.

In step 1, the scan method instruction unit 7 obtains scan information from the identification information storage unit 5 and informs the output switching unit 81 whether the scan information obtained indicates non-interlace scanning or interlaced scanning.

When it is found from the judgment in step 2 that the information indicates interlaced scanning, step 4 and step 6 are executed; in step 4, the output switching unit 81 receives the input from the interlaced scanning type video decoding unit 4, and in step 6, the input is directly output to the video display unit 8.

When it is found from the judgment in step 2 that the information indicates non-interlace scanning, step 3 and step 5 are executed. In step 3, the output switching unit 81 receives the input from the non-interlace scanning type video decoding unit 3, and in step 5, the output switching unit 81 converts the input into a signal of an interlaced scanning type and outputs the converted signal to the video display unit 8.

When either step 3 or step 4 is executed, the video signals output in the following step 5 and step 6 are signals of an interlaced scanning type, and the display corresponding to this scanning type is performed at the video display unit 8.

The second application example is that a monitor corresponding to non-interlace scanning only is used as the video display unit 8, and in this application example, the video data reproducing apparatus has the same configuration as that shown in FIG. 14 although the output switching unit 81 operates differently.

Figure 17:
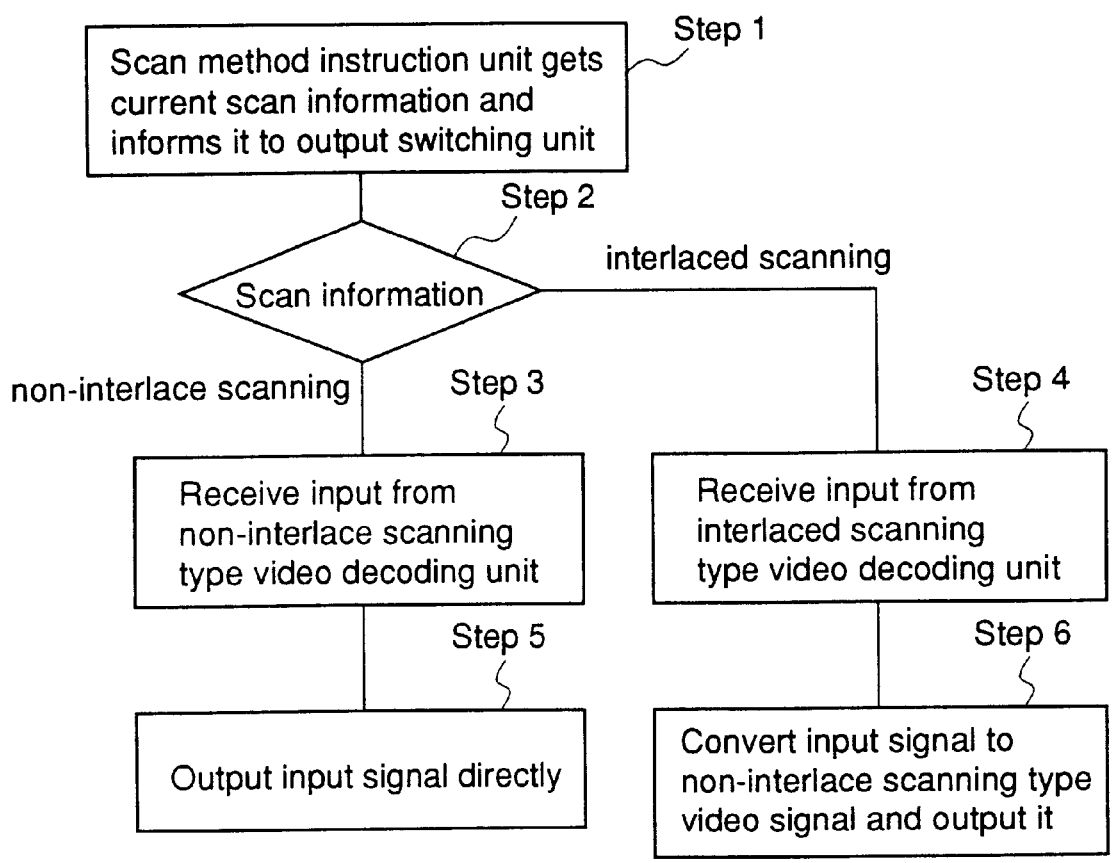
FIG. 17 is a flowchart for explaining the operation of the second application example of the video data reproducing apparatus according to the above embodiment.

FIG. 17 is a flowchart illustrating the operation of the second application of the video data reproducing apparatus according to the fourth embodiment. Hereinafter this operation of the second application example will be described with reference to the flow of FIG. 17.

Initially, in step 1, the scan method instruction unit 7 obtains scan information from the identification information storage unit 5, and informs the output switching unit 81 whether the obtained identification information indicates non-interlace scanning or interlaced scanning.

When it is found from the judgment in step 2 that the obtained information indicates non-interlace scanning, step 3 and step 5 are executed; in step 3, the output switching unit 81 selects the input from the non-interlace scanning type video decoding unit 3, and in step 6, the output switching unit 81 outputs the input directly to the video display unit 8.

When it is found from the judgment in step 2 that the obtained information indicates interlaced scanning, step 4 and step 6 are executed. In step 4, the output switching unit 81 selects the input from the interlaced scanning type video decoding unit 4, and in step 6, the output switching unit 81 converts the input into a signal of a non-interlace scanning type and outputs the converted signal to the video display unit 8.

When either step 3 or step 4 is executed, the video signals output in the following step 5 and step 6 are signals of a non-interlace scanning type, and the display corresponding to this scanning type is performed at the video display unit 8.

Further in the fourth embodiment and the first and second applications examples thereof, the non-interlace scanning type video decoding unit 3 and the interlaced scanning type video decoding unit 4 may initiate decoding after the receipt of the instruction from the scan method instruction unit 7 as described above and may continue to decode the video data from the previous stage.

Furthermore, the above description is based on an assumption that the transmission data according to the first embodiment is received, but the transmission data according to the second and third embodiments may be used and the same effects may be obtained in this case although the separating unit 2 performs separation and extraction in a different way.

As described above, the video data reproducing apparatus according to the fourth embodiment comprises the output switching unit 81 and therefore can select the video data subjected to decoding processing by the non-interlace scanning type video decoding unit 3 or the video data subjected to decoding processing by the interlaced scanning type video decoding unit 4 and output it as a video signal to the video display unit 8, or convert the selected data and output it, whereby video signals of different scanning types can be reproduced and displayed in both the case that a monitor used as the video display unit 8 deals with video signals of different scanning types and the case that a monitor used as the video display unit 8 deals with video signals of a single scanning type only.

Embodiment 5

A method for transmitting video data and a video data transmitting apparatus according to a fifth embodiment of the invention enable to multiplex and transmit not only video data of different scanning types but program guide, and a video data reproducing apparatus according to the fifth embodiment is capable of correct reproduction of video and display of program guide to provide the information about video data.

Figure 18:
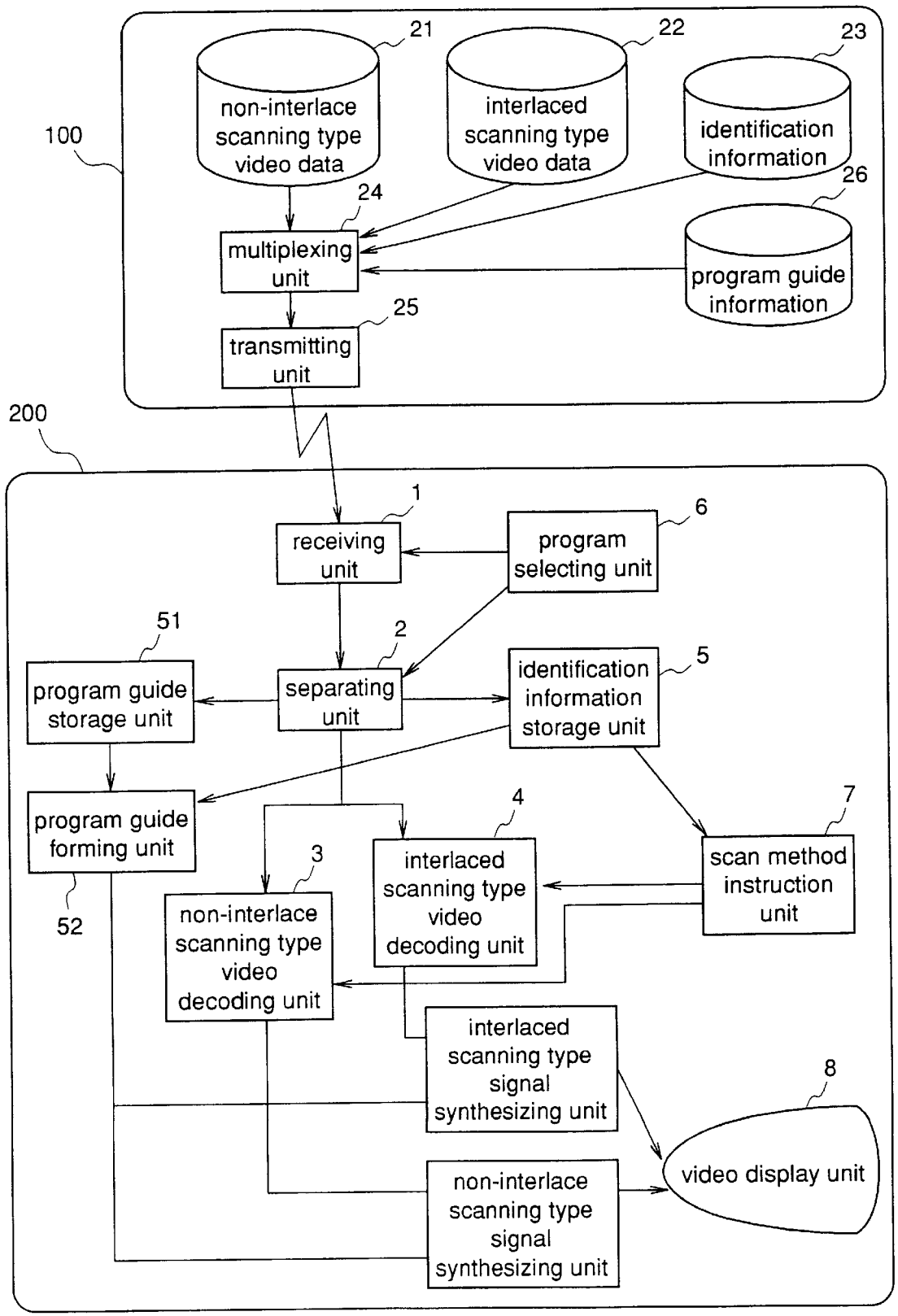
FIG. 18 is a diagram illustrating configurations of a video data transmitting apparatus and a video data reproducing apparatus according to a fifth embodiment of the invention.

FIG. 18 is a explanatory diagram illustrating the video transmitting apparatus and video reproducing apparatus according to the fifth embodiment of the invention. Referring to the figure, the reference numerals shown in FIG. 1 designate same or corresponding parts. The transmitting apparatus 100 further comprises a program guide information storage unit 26, and in this transmitting apparatus, non-interlace scanning type video data, interlaced scanning type video data, program guide information, and service information including identification information about the scanning type of each broadcast program are multiplexed in the multiplexing unit 24 and transmitted from the transmitting unit 25. Of this multiplexed data, the program guide information and the identification information about the scanning type of each broadcast program are described in an EIT (event information table) packet. The multiplexed data transmitted from the video data transmitting apparatus 100 of the fifth embodiment has the same structure as that transmitted from the transmitting apparatus of the second embodiment, and thus FIG. 7 is used for the explanation.

The video data reproducing apparatus 200 shown in FIG. 18 has the configuration of the reproducing apparatus of the second embodiment (see FIG. 1) which further comprises the following elements. Reference numeral 51 designates a program guide storage unit for storing program guide information obtained from the EIT (event information table). Numeral 52 designates a program guide forming unit for processing the information from the program guide storage unit 51 into visible information. Numeral 9 designates an interlaced scanning type synthesizing unit for synthesizing the signals from the interlaced scanning type video decoding unit 4 and the program guide forming unit 52. Numeral 10 designates a non-interlace scanning type synthesizing unit for synthesizing the signals from the non-interlace scanning type video decoding unit 3 and the program guide forming unit 52.

Figure 19:
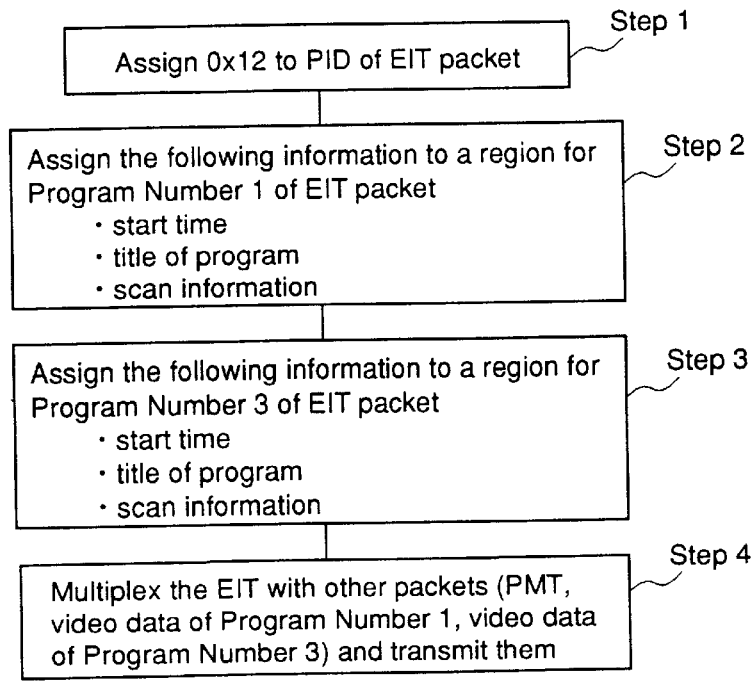
FIGS. 19(a) and 19(b) are flowcharts for explaining the operation of selecting broadcast program by the video data reproducing apparatus according to the above embodiment.
Figure 19:
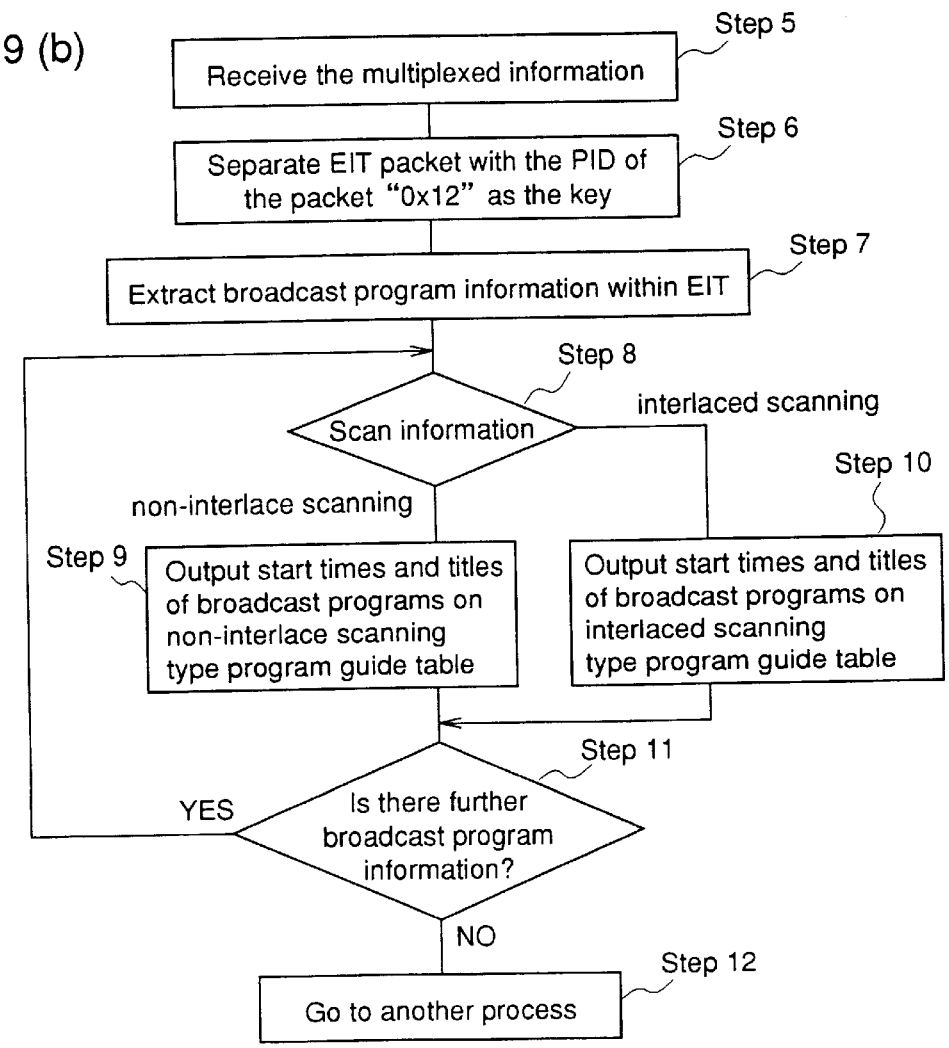

FIGS. 19 designate flowcharts respectively showing the operation of transmitting video data and the operation of reproducing video data. A description is given of the operation of the transmitting apparatus and reproducing apparatus of the fifth embodiment above configured.

At the transmitting end, video data packets are initially formed. The formation method is identical to that in the second embodiment. These packets allow video data of different scanning types to be used as the respective broadcast programs of the respective programs (whose program numbers are 1 and 3) as in the second embodiment, although this fact is not described in detail here.

Next, service information packets are formed. Here only the formation of EIT packet will be described with reference to the flow of FIG. 19(a). Initially, in step 1, 0x12 is subjected as PID which is the header of the EIT packet, and in step 2, the following data is stored as the information about Program Number 1 in the EIT.

start time: 19:00
title of program: Baseball 1
component type: 0x21 (code indicating non-interlace scanning)
start time: 20:00
title of program: Quiz
component type: 0x01 (code indicating interlaced scanning)
start time: 21:00
title of program: Foreign film
component type: 0x21 (code indicating non-interlace scanning)

Then, in step 3, the following data is stored as the information about Program Number 3 in the EIT.

start time: 19:00
title of program: Baseball 1
component type: 0x01 (code indicating interlaced scanning)
start time: 20:00
title of program: Soccer
component type: 0x21 (code indicating non-interlace scanning)
start time: 21:00
title of program: Baseball 2
component type: 0x21 (code indicating non-interlace scanning)
start time: 21:00
title of program: News
component type: 0x21 (code indicating non-interlace scanning)

In step 4, the EIT packet, the video data packets of Program Number 1 and Program Number 3, and the other service information packets including PMT which describes the PID of the video data of each Program Number are multiplexed by the multiplexing unit 24 to obtain the multiplexed data. Then, the resultant multiplexed data is transmitted from the transmitting unit 25.

Further, a description is given of the reproduction operation performed by the video data reproducing apparatus 200 after the receipt of the transmission data shown in FIG. 7, with reference to the flow of FIG. 19(b).

First of all, in step 5, the receiving unit 1 receives the multiplexed data which is transmitted. In step 6, the separating unit 2 separates and extracts the EIT (Event Information Table) packet with the packet identifier PID 0x12 as the key. In step 7, the respective start times, titles, scan information of the broadcast programs of Program Number 1 and Program number 3 are decoded from the EIT and stored in the program guide storage unit 51. In addition, as in the second embodiment, the PID of the video data obtained from the data of the PMT and the scan information of each video data from the EIT are stored in the identification information storage unit 5.

In step 8, judgment is made, and then step 9 is performed for the broadcast program for non-interlace scanning, wherein the program guide forming unit 52 registers the program title and start time of the non-interlace scanning type program guide in a program guide for non-interlace scanning type. On the other hand, when it is found that the obtained information is for interlaced scanning, step 10 is performed instead of step 9, wherein the program guide forming unit 52 registers the program title and start time of the interlaced scanning type broadcast program in a program guide for interlaced scanning type. Further, the program guide forming unit 52 transmits the formed program guide to the interlaced scanning type signal synthesizing unit 9 and the non-interlace scanning type signal synthesizing unit 10, and the video display unit 8 outputs the program guide.

FIG. 20 is a diagram illustrating a program guide output on the screen of the display of the video data reproducing apparatus according to the fifth embodiment. As shown in the figure, the broadcast programs of a non-interlace scanning type and the broadcast programs of an interlaced scanning type are output separately in separate program guides. Further, these program guides may be output as a program guide as shown in FIG. 21 to show difference of scanning types of broadcast programs.

After the execution of step 9 or step 10, in step 11, judgment is made whether there is left the program information to be offered and, when there is such information, this step is followed by step 8, and steps 8, 9 and 10 are repeated.

When it is judged in step 11 that all the program information has been offered, step 12 is executed and the other process is started.

The other process is the decoding processing of non-interlace scanning type or interlaced scanning type video data as described in the second embodiment. For example, when a viewer selects Program Number 1 in a time range from 20:00 to 21:00, it is recognized that the PID of the video data to be reproduced is 0x91 and the scan method for the data is interlaced scanning. The program selecting unit 6 instructs the separating unit 2 to separate a packet whose PID is 0x91, and the scan method instruction unit 7 gives decode instruction to the interlaced scanning type decoding unit 4.

On the other hand, when the viewer selects Program Number 3, it is recognized that the PID of the video data to be reproduced is 0x93 and the scan method for the data is non-interlace scanning, based on the information stored in the identification information storage unit 5 from the contents of the PMT and EIT. The program selecting unit 6 instructs the separating unit 2 to separate a packet whose PID is 0x93 and the scan method instruction unit 7 gives decode instruction to the non-interlace scanning type decoding unit 3.

Then, the video signals decoded by the interlaced scanning type decoding unit 4 and the non-interlace scanning type decoding unit 3 are input to the video display unit 8 through the interlaced scanning type signal synthesizing unit 9 and the non-interlace scanning type signal synthesizing unit 10 to be displayed on the screen.

As described above, the method for transmitting video data according to the fifth embodiment enables to transmit multiplexed data which includes the program guide information in the EIT (event information table) as the service information, and the video data transmitting apparatus according to the fifth embodiment comprises the program guide information storage unit 26 to implement the above-described transmission method.

Moreover, the video data reproducing apparatus according to the fifth embodiment, which selects and reproduces one of plural broadcast programs transmitted by the video data transmission method wherein plural pieces of video data of plural broadcast programs including interlaced scanning type video data and non-interlace scanning type video data are multiplexed with the event information table showing the contents of the video data of each broadcast program in each time period and the information for judging whether the video data of each broadcast program included in the event information table is of a non-interlace scanning type or of an interlaced scanning type to be transmitted, comprises the program guide outputting means for forming a program guide showing the contents of each broadcast program in each time period and the scan method for the video data and outputs the guide on the display screen as visible information, whereby the scan method for the broadcast program to be selected can be recognized, thereby preventing incorrect selection by viewer.

Although in the fifth embodiment described is the video data reproducing apparatus which comprises both the interlaced scanning type video decoding unit and the non-interlace scanning type video decoding unit and can reproduce a selected program correctly regardless of the scanning type, in the case that the video data reproducing apparatus comprises only one of the interlaced scanning type decoding unit and the non-interlace scanning type decoding unit, the reproducing apparatus can also prevent incorrect program selection if it has a configuration capable of notifying viewer that his selection is incorrect by the medium of video display or sound display when the viewer selects a program whose scanning type does not correspond to the decoding unit of the video data reproducing apparatus.

Moreover, in the case that the video data reproducing apparatus comprising only one of the interlaced scanning type decoding unit or the non-interlace scanning type decoding unit, the reproducing apparatus can also prevent incorrect program selection if it has a configuration capable of displaying on the screen a program guide of reproducible broadcast programs.

Embodiment 6

A method of transmitting video data and a video data transmitting apparatus according to a sixth embodiment of the invention enable to multiplex and transmit pieces of video data of different scan methods by adding identification information to a NIT (network information table) which is service information, and the video data reproducing unit according to the sixth embodiment is capable of reproducing the resulting multiplexed data correctly.

Figure 22:
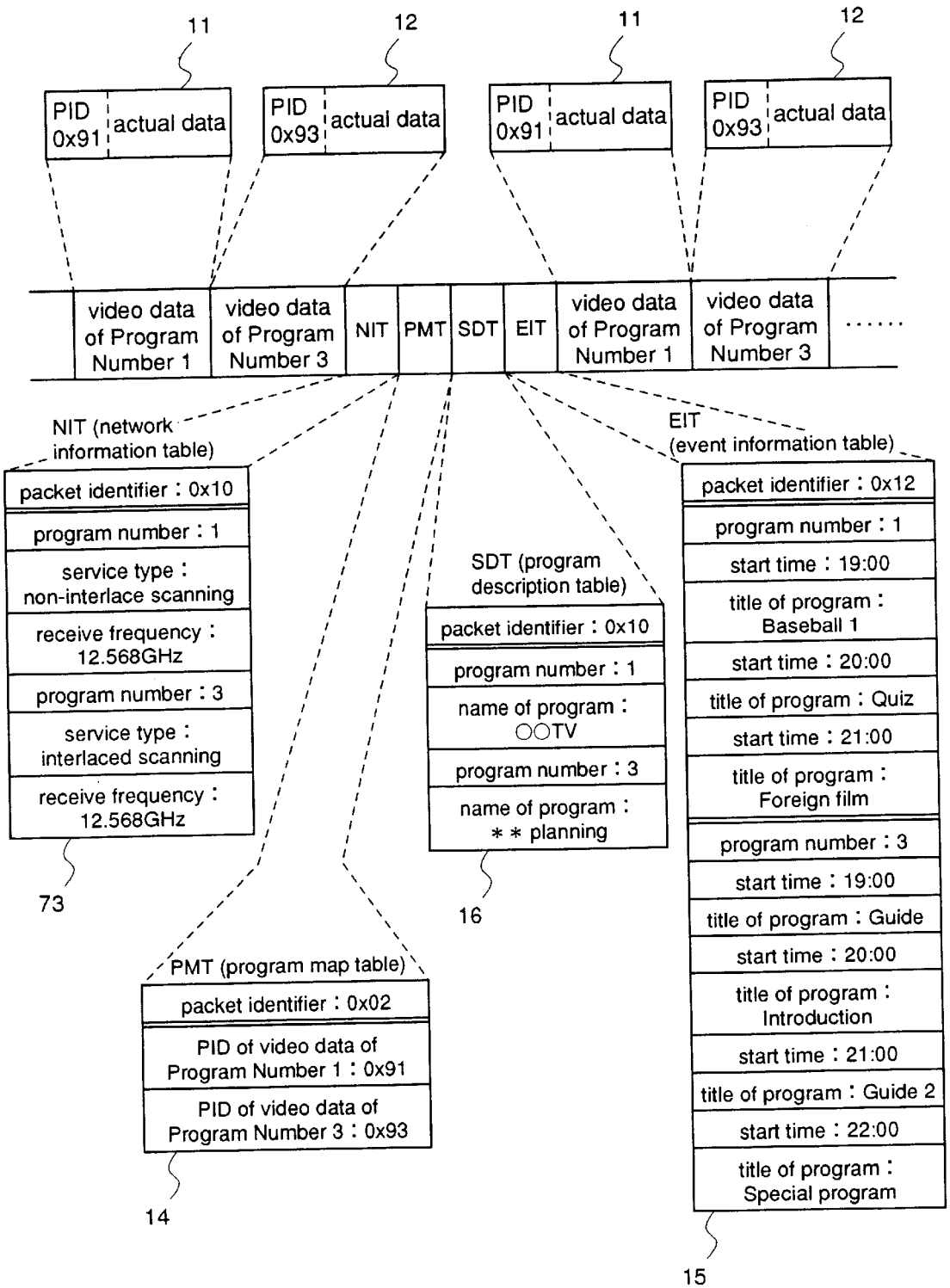
FIG. 22 is a diagram illustrating a structure of multiplexed data transmitted by a method of transmitting video data according to a sixth embodiment of the invention.

FIG. 22 is a diagram illustrating the data structure of transmission data in the method of transmitting video data of the sixth embodiment. The difference between this and the transmission data shown in FIG. 32 according to the prior art method (second example) is that "program list" is included among the descriptors within the NIT (network information table) 73 and the program list includes "service type" which is a code indicating whether video data is of an interlaced scanning type or of a non-interlace scanning type.

FIG. 23 is a diagram illustrating the data structure of the NIT (network information table). FIG. 24 illustrates an example of code assignment to the service type of the service list. Here assume that codes 0x01 to 0x04 indicate interlaced scanning and codes 0x05 to 0x08 indicate non-interlace scanning. Further assume that in this case, in addition to the types of services such as digital TV and mosaic broadcasting as described in the prior art, the types of services regarding Near Video On Demand (NVOD) are included in this case although a detailed description thereof is omitted. Moreover, the code assignment is not limited to this example, as in the first embodiment.

The video data transmitting apparatus and video data reproducing apparatus according to the sixth embodiment have the same configurations as those of the first embodiment, and thus FIG. 1 is used for the explanation.

Next, a description is given of the operation of the video data transmitting apparatus 100 and the video data reproducing apparatus 200 according to the sixth embodiment.

Initially, in the transmitting apparatus 100, video data of each broadcast program included in Program Number 1 and that of each broadcast program included in Program Number 3 are obtained from the non-interlace scanning type storage unit and the interlaced scanning type storage unit, respectively, to form the video data packets of the respective programs. The packets to which PIDs are given are formed by the same method used in the first embodiment.

Next, service information packets are formed. A description is given of the NIT packet here. First of all, 0x10 is assigned as the PID which is the header of the NIT packet, and the following data is stored in the NIT as the information about Program Number 1.

program number: 1 service type: 0x05 (code indicating non-interlace scanning)

Next, the following data is stored in the NIT as the information about Program Number 3.

program number: 3 service type: 0x01 (code indicating interlaced scanning)

Thereafter, the service information packets including this NIT, the video data packets of Program Number 1 and Program Number 3 are multiplexed by the multiplexing unit 24 and the resultant multiplexed data is transmitted from the transmitting unit 25.

Further, the procedure in which the video data reproducing apparatus 200 receives the transmission data shown in FIG. 22 and performs the reproduction operation is as follows.

First of all, the receiving unit 1 receives the multiplexed data which is transmitted and the separating unit 2 separates and extracts the PMT packet with the packet identifier PID 0x02 as the key and the NIT packet with the packet identifier PID 0x10 as the key.

Then, the data of the PMT is decoded to obtain the information: "the PID of the video data of Program Number 1 is 0x91" and "the PID of the video data of Program Number 3 is 0x93", and the data of the NIT is decoded to obtain the information: "the scan method for the video data of Program Number 1 is non-interlace scanning" and "the scan method for the video data of Program Number 3 is interlaced scanning", and the information obtained is stored in the identification information storage unit 5.

Then, program selection from viewer is accepted by the medium of a remote controller or channel buttons of a monitor, and when a viewer selects Program Number 1, it is recognized that the PID of the video data to be reproduced is 0x91 and the scan method for the data is non-interlace scanning. The program selecting unit 6 instructs the separating unit 2 to separate a packet whose PID is 0x91 and the scan method instruction unit 7 gives decode instruction to the non-interlace scanning type decoding unit 3. On the other hand, when the viewer selects Program Number 3, it is recognized that the PID of this video data is 0x93 and the scan method for the data is interlaced scanning, on the basis of the information from the identification information storage unit 5. The program selecting unit 6 instructs the separating unit 2 to separate a packet whose PID is 0x93 and the scan method instruction unit 7 gives decode instruction to the interlaced scanning type decoding unit 4.

Thus, in the method of transmitting video data according to the sixth embodiment wherein plural pieces of video data of plural broadcast programs are divided into packets, respectively, and the plural packets of the video data and packets including information about the broadcast programs are multiplexed and transmitted, video data whose reproduction mode on a program basis is non-interlace scanning, video data whose reproduction mode on a program basis is interlaced scanning are transmitted as the pieces of video data of plural broadcast programs, and the information for judging whether the video data of a broadcast program is of a non-interlace scanning type or of an interlaced scanning type on a program basis is transmitted, which information is described in the network information table 73 showing through which channel a broadcast program is transmitted, whereby both interlaced scanning type video data and non-interlace scanning type video data can be transmitted such that the video data of each of these scan methods is reproduced correctly at the receiving end, resulting in improved degree of freedom in programming of broadcast programs to be transmitted.

Further, the video data transmitting apparatus of the sixth embodiment having the same configuration as the transmitting apparatus of the first embodiment can implement the above-described transmission method and obtain the above-described effects.

Further, the video data reproducing apparatus of the sixth embodiment has the same configuration as that of the first embodiment and can correctly reproduce the non-interlace scanning type video data and the interlaced scanning type video data in the multiplexed data transmitted by the transmission method and reproduce them.

Embodiment 7

A method of transmitting video data and a video data transmitting apparatus according to a seventh embodiment of the invention enable to multiplex and transmit pieces of video data of different scan methods by adding the identification information to a SDT (service description table) which is service information, and a video data reproducing apparatus according to this embodiment is capable of reproducing the resulting multiplexed data correctly.

Figure 25:
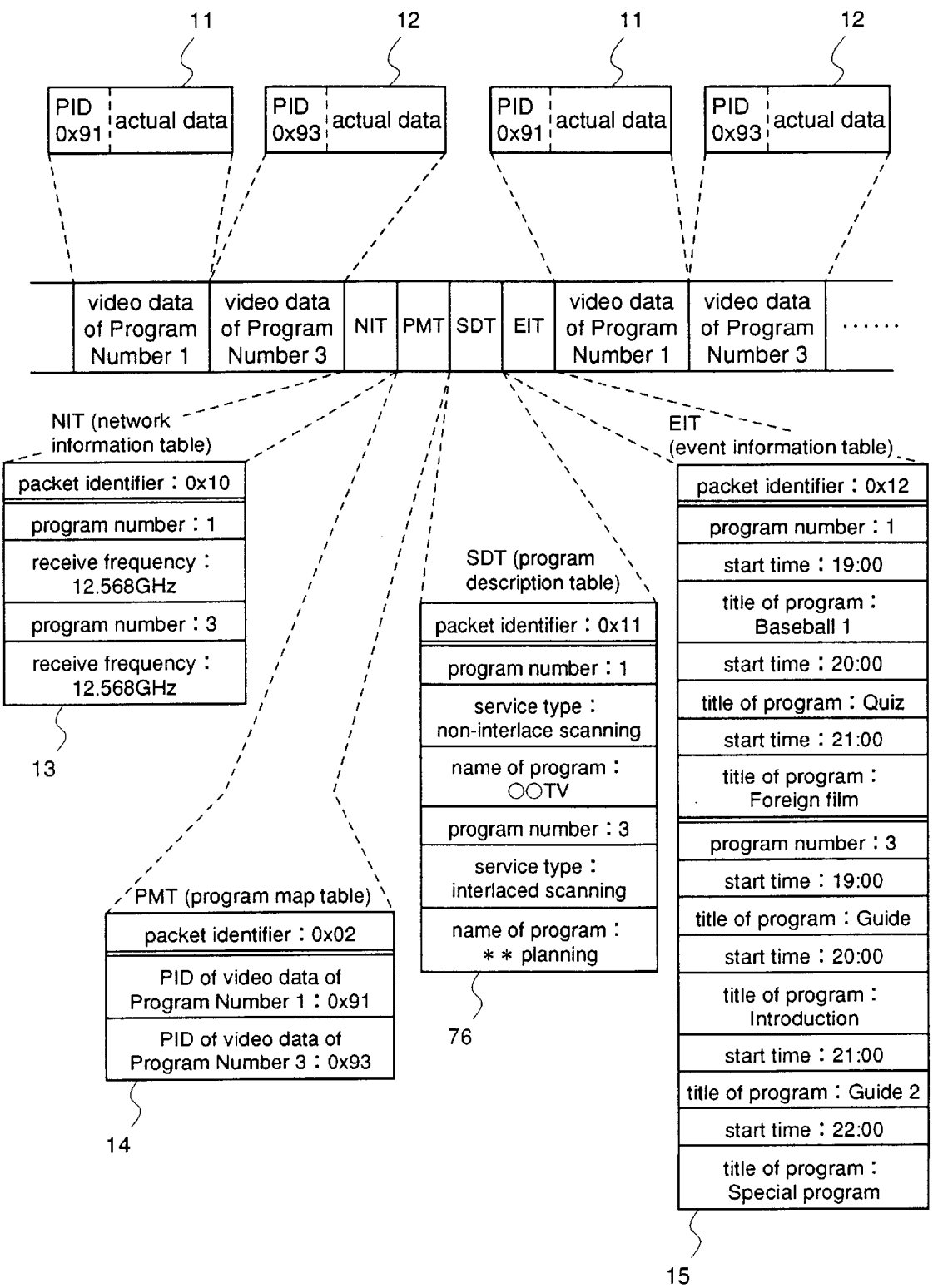
FIG. 25 is a diagram illustrating a structure of multiplexed data transmitted by a method of transmitting video data according to a seventh embodiment of the invention.

FIG. 25 is a diagram illustrating a data structure of transmission data in the method of transmitting video data of the seventh embodiment. The difference between this and the transmission data shown in FIG. 32 according to the prior art method (second example) is that the SDT (service description table) 76 includes service type which is a code indicating whether video data is of a non-interlace scanning type or of an interlaced scanning type.

As shown in the example of the SDT 76 of FIG. 25, the data structure of the SDT (service table) consists of program number, service type, and name of program. The exemplary code assignment of the sixth embodiment shown in FIG. 24 may be used as the code assignment to service type and it is assumed here that codes 0x0001 to 0x004 indicate interlaced scanning and codes 0x0005 to 0x008 indicate non-interlace scanning. The code arrangement is not limited to this example, as in the first embodiment.

The video data transmitting apparatus and video data reproducing apparatus according to the seventh embodiment have the same configuration as those of the first embodiment, and thus FIG. 1 is used for the explanation.

Next, a description is given of the operation of the video data transmitting apparatus 100 and the video data reproducing apparatus according to the seventh embodiment.

In the transmitting apparatus 100, video data of each broadcast program included in Program Number 1 and video data of each broadcast program included in Program Number 3 are obtained from the non-interlace scanning type storage unit and the interlaced scanning type storage unit, respectively, to form the video data packets of the respective programs. The packets to which PIDs are given are formed in the same manner used in the first embodiment.

Next, service information packets are formed. The formation of the SDT packet will be described here. Initially, 0x11 is assigned as PID which is the header of the SDT packet. Then, the following data is stored as the information about Program Number 1.

program number: 1 service type: 0x05 (code indicating non-interlace scanning)

name of program: OO TV

Next, the following data is stored as the information about Program Number 3 in the NIT.

program number: 3 service type: 0x01 (code indicating interlaced scanning)

name of program: ** planning

Thereafter, the service information packets including this SDT packet and the video data packets of Program Number 1 and Program Number 3 are multiplexed by the multiplexing unit 24 and the resulting multiplexed data is transmitted from the transmitting unit 25.

Further, the procedure in which the video data reproducing apparatus 200 receives the transmission data shown in FIG. 25 and performs reproduction operation is as follows.

Initially, the receiving unit 1 receives the multiplexed data transmitted, and the separating unit 2 separates and extracts the PMT packet with the packet identifier PID 0x02 as the key and the SDT packet with the packet identifier PID 0x11 as the key.

Then, the data of the PMT is decoded to obtain the information: "the PID of the video data of Program Number 1 is 0x91" and "the PID of the video data of Program Number 3 is 0x93", and the data of the SDT is decoded to obtain the information: "the scan method for the video data of Program Number 1 is non-interlace scanning" and "the scan method for the video data of Program Number 3 is interlaced scanning", and such information is stored in the identification information storage unit 5.

Subsequently, program selection from viewer is accepted through the medium of remote controller or channel buttons of a monitor, and when a viewer selects Program Number 1, it is recognized on the basis of the information from the identification information storage unit 5 that the PID of the video data to be reproduced is 0x91 and the scan method for the data is non-interlace scanning. The program selecting unit 6 instructs the separating unit 2 to separate a packet whose PID is 0x91, and the scan method instruction unit 7 gives decode instruction to the non-interlace scanning type decoding unit 3. On the other hand, when the viewer selects Program Number 3, it is recognized on the basis of the information from the identification information storage unit 5 that the PID of the video data is 0x93 and the scan method for the data is interlaced scanning. The program selecting unit 6 instructs the separating unit 2 to separate a packet whose PID is 0x93, and the scan method instruction unit 7 gives decode instruction to the interlaced scanning type decoding unit 4.

As described above, in the method of transmitting video data according to the seventh embodiment wherein plural pieces of video data of plural broadcast programs are divided into packets, respectively, and the plural packets of the video data and packets including information regarding to the broadcast programs are multiplexed and transmitted, video data whose reproduction mode on a program basis is non-interlace scanning and video data whose reproduction mode on a program basis is interlaced scanning are transmitted as the pieces of video data of plural broadcast programs, and the information for judging whether video data of a broadcast program is of a non-interlace scanning type or of an interlaced scanning type on a program basis is transmitted, which information is described in the service description table 76 including the names and service types of the respective programs as the information, whereby both interlaced scanning type video data and non-interlace scanning type video data can be transmitted in such a way the video data of each of these scan methods is reproduced correctly at the receiving end, resulting in improved degree of freedom in programming of broadcast programs to be broadcasted.

Further, the video data transmitting apparatus according to the seventh embodiment comprising the same configuration as that of the first embodiment can implement the above-described transmission method and obtain the aforesaid effects.

Furthermore, the video data reproducing apparatus of the seventh embodiment has the same configuration as that of the first embodiment and can correctly reproduce both the non-interlace scanning type video data and the interlaced scanning type video data in the multiplexed data transmitted by the above-described transmission method, and display the reproduced data.

Embodiment 8

A method of transmitting video data and a video data transmitting apparatus according to an eighth embodiment of the invention enable to multiplex and transmit pieces of video of different scan methods on a broadcast program basis by adding identification information to a NIT (network information table) which is service information, and a video data reproducing apparatus according to the eighth embodiment is capable of reproducing the resulting multiplexed data correctly.

Figure 26:
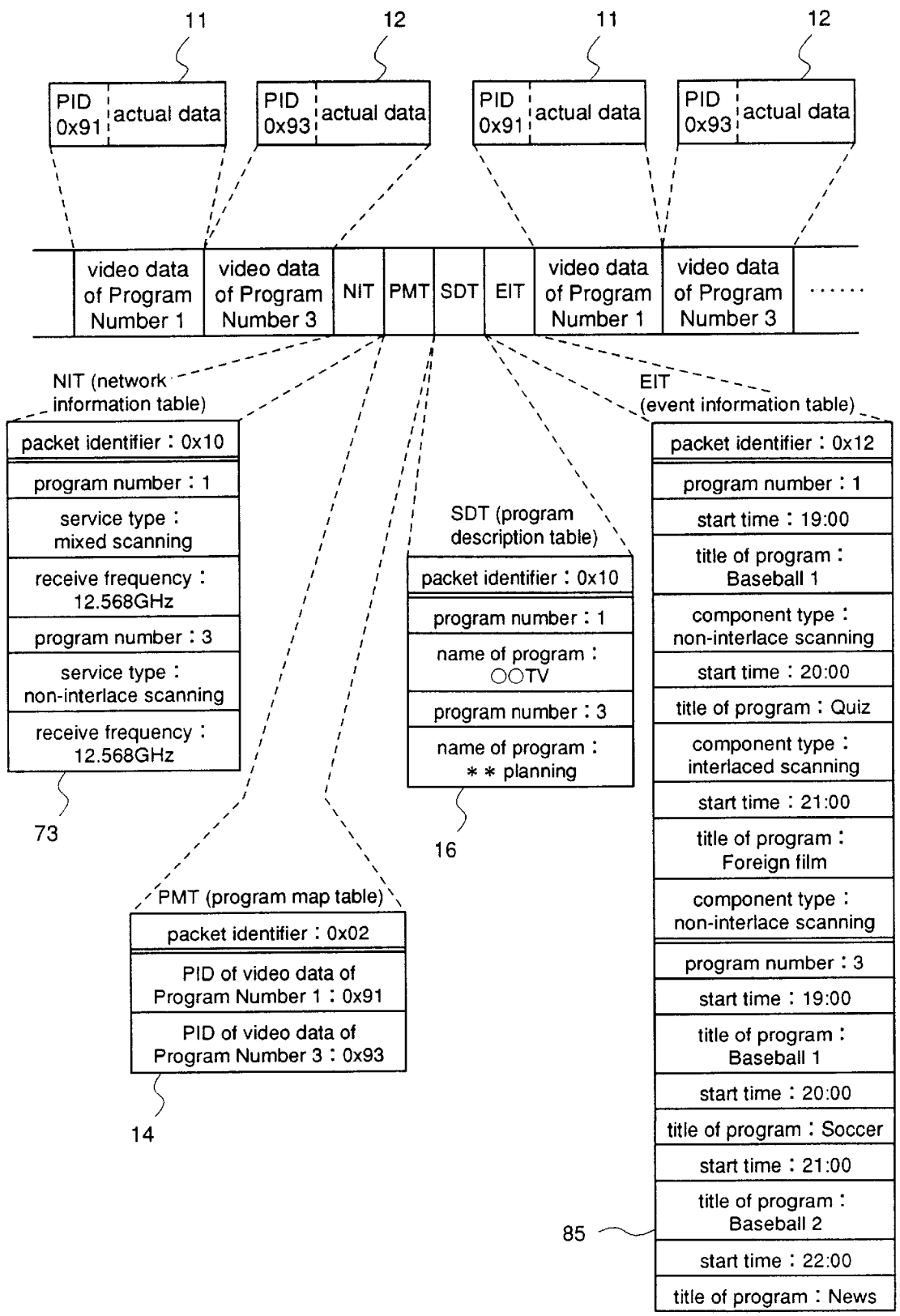
FIG. 26 is a diagram illustrating a structure of multiplexed data transmitted by a method of transmitting video data according to an eighth embodiment of the invention.
Figure 32:
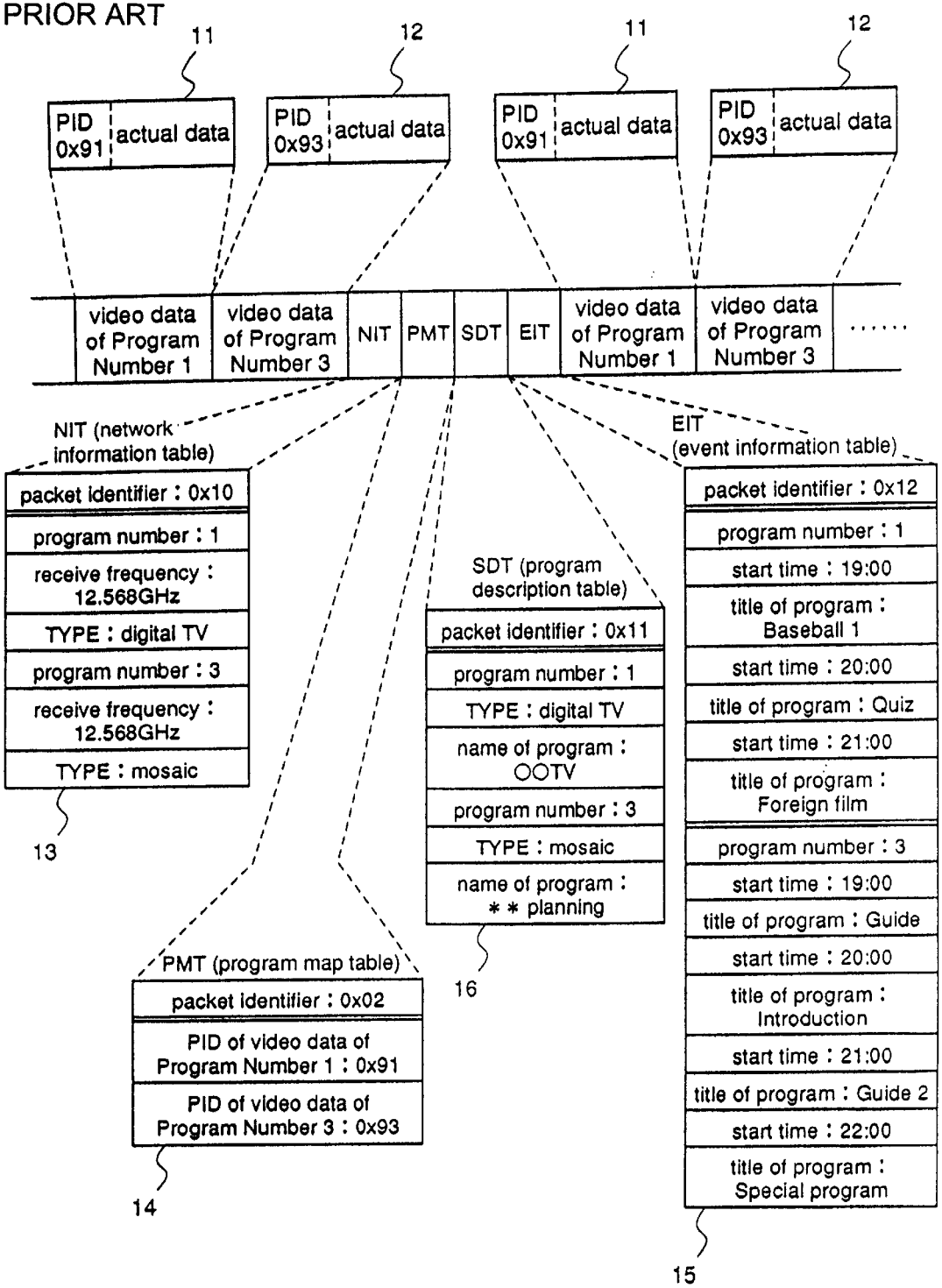
FIG. 32 is a diagram illustrating a structure of multiplexed data transmitted by a method of transmitting video data according to a second example of the prior art.
Figure 33:
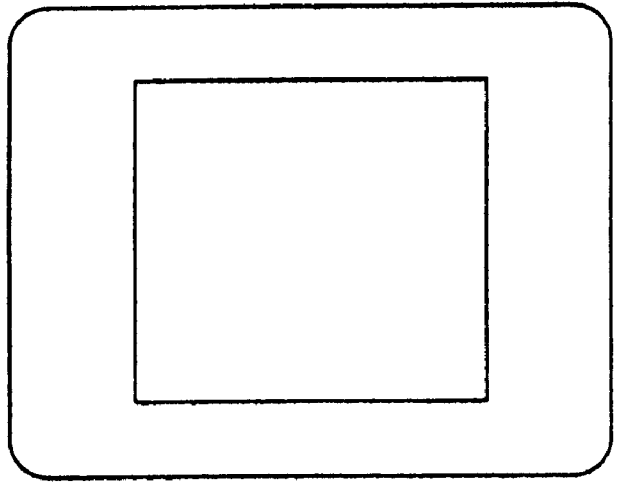
FIGS. 33(a) and 33(b) are diagrams for explaining the types of the video data in a method of transmitting video data according to the second example of the prior art.
Figure 33:
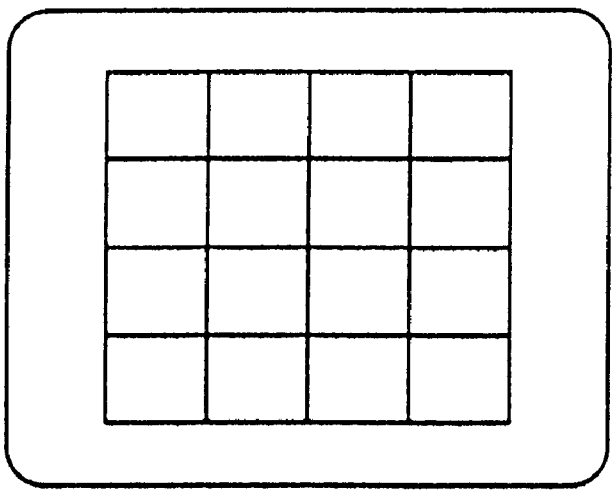

FIG. 26 is a diagram illustrating a data structure of transmission data in the method of transmitting video data of the eighth embodiment. The differences between this and the transmission data in the prior art method (second example) shown in FIG. 32 are the following points: one point is that "program list" is among the descriptors included in the NIT (network information table) 73 and the program list includes service type which is a code indicating whether video data is of a non-interlace scanning type or of an interlaced scanning type; the other point is that "component type" indicating components of broadcast program can be described in the EIT (event information table) 85, and in some programs, a code for judging whether video data is of a non-interlace scanning type or of an interlaced scanning type is included in the component type.

The data structure of the NIT (network information table) shown in FIG. 23 is equal to that of the sixth embodiment. FIG. 27 illustrates an example of a code assignment to service type in the service list. In the eighth embodiment, as in the sixth embodiment, codes 0x01 to 0x04 indicate interlaced scanning and codes 0x05 to 0x08 indicate non-interlace scanning and, codes 0x11 to 0x14 are assigned to programs each including broadcast programs of different scan methods. The code arrangement is not restricted to the example shown here as in the first embodiment.

The video data transmitting apparatus and video data reproducing apparatus according to the eighth embodiment have the same configuration as those of the first embodiment, thus FIG. 1 is used for the explanation.

Next, the video data transmitting apparatus 100 and video data reproducing apparatus 200 according to the eighth embodiment will be described.

The transmitting apparatus 100 forms video data packets. Broadcast programs included in each program may be of a same scanning type on a program basis, and a program including broadcast programs of different scan methods may be used. In this case, the pieces of video data including non-interlace scanning type video data and interlaced scanning type video data are used for the broadcast programs included in Program Number 1 and packets are formed from the following pieces of video data: "Baseball 1" obtained from the non-interlace scanning type video data storage unit 21, "Quiz" obtained from the interlaced scanning type video data storage unit 22, and "Foreign film" obtained from the non-interlace scanning type video data storage unit 21. On the other hand, it is the non-interlace scanning type video data only which is employed for the broadcast programs included in Program Number 3. The pieces of video data are obtained from the respective storage units, and the video data packets of the respective programs to which PIDs are given are formed in the same manner used in the first embodiment.

Next, service information packets are formed. In the eighth embodiment, the EIT packet is formed after the formation of the NIT packet. Initially, the NIT packet is formed. 0x10 is assigned as the PID which is the header of the NIT packet. Then, the following data is stored as the information about Program Number 1 in a service list which is included as a descriptor.

program number 1: 1 service type: 0x11 (code indicating mixed scanning)

Next, the following data is stored in the NIT as the information about Program Number 3.

program number: 3 service type: 0x01 (code indicating non-interlace scanning)

Then, EIT packet is formed. Initially, 0x12 is assigned as the PID which is the header of the EIT packet. Since the scan methods of the broadcast programs are mixed in Program Number 1, the following data is then stored as the information about Program Number 1 in the EIT.

start time: 19:00 title of program: Baseball 1 component type: 0x21 (code indicating non-interlace scanning)

start time: 20:00 title of program: Quiz component type: 0x01 (code indicating interlaced scanning)

start time: 21:00 title of program: Foreign film component type: 0x21 (code indicating non-interlace scanning)

Next, since Program Number 3 comprises non-interlace scanning type broadcast programs only, the following data is stored in the EIT as the information about this program.

start time: 19:00 title of program: Baseball 1 start time: 20:00 title of program: Soccer start time: 21:00 title of program: Baseball 2 start time: 21:00 title of program: News

That is, for Program Number 3, the EIT packet is formed without giving a code indicating a scan method to the component type.

Thereafter, the service information packets including the NIT and the EIT, the video data packets of Program Number 1 and Program Number 3 are multiplexed by the multiplexing unit 24, and the resulting multiplexed data is transmitted from the transmitting unit 25.

Further, the procedure in which the video data reproducing apparatus 200 receives the transmission data shown in FIG. 26 and performs reproduction operation is as follows.

First of all, the receiving unit 1 receives the multiplexed data which is transmitted, and the separating unit 2 separates and extracts the PMT packet with the packet identifier PID 0x02 as the key and the NIT packet with the packet identifier PID 0x10 as the key, and the EIT packet with the packet identifier PID 0x12 as the key.

Then, the data of the PMT is decoded to obtain the information: "the PID of the video data of Program Number 1 is 0x91" and "the PID of the video data of Program Number 3 is 0x93", and such information is stored in the identification information storage unit 5. The data of the NIT is decoded to obtain the information: "the scan method for the video data of Program Number 1 is mixed scanning" and "the scan method for the video data of Program Number 3 is non-interlace scanning". Then, for Program Number 1 whose scanning type is mixed scanning, the data of the EIT is decoded to obtain the information, for example, "the scan method for the video data of Program Number 1 is interlaced scanning", when the current time is within a time range from 20:00 to 21:00, and this information is stored with the previously obtained information that the scan method for the video data of Program Number 3 is non-interlace scanning" in the identification information storage unit 5.

Then, program selection from viewer is accepted through the medium of a remote controller and channel buttons of a monitor and, when a viewer selects Program Number 1, it is recognized on the basis of the information from the identification information storage unit 5 that the PID of the video data to be reproduced is 0x91 and the scan method for this data is interlaced scanning. The program selecting unit 6 instructs the separating unit 2 to separate a packet whose PID is 0x91 and the scan method instruction unit 7 gives decode instruction to the interlaced scanning type decoding unit 4. On the other hand, when the viewer selects Program Number 3, it is recognized on the basis of the information from the identification information storage unit 5 that the PID of the video data is 0x93 and the scan method for the data is non-interlace scanning. The program selecting unit 6 instructs the separating unit 2 to separate a packet whose PID is 0x93 and the scan method instruction unit 7 gives decode instruction to the non-interlace scanning type decoding unit 3.

As described above, in the method of transmitting video data according to the eighth embodiment wherein plural pieces of video data of plural broadcast programs are divided into packets, respectively, and the plural packets of the video data and packets including information about the broadcast programs are multiplexed and then transmitted, video data whose reproduction mode is non-interlace scanning on a broadcast program basis and video data whose reproduction mode is interlaced scanning on a broadcast program basis are transmitted as the pieces of video data of plural broadcast programs, and the information for judging whether video data is of a non-interlace scanning type or of an interlaced scanning type, or of a mixed scanning type is transmitted, which information is described in the network information table 73 indicating through which channel a broadcast program is transmitted, and for the program whose scan method is a mixed scanning, the information for identifying the scan method for the video data of each broadcast program is transmitted, which information is described in the event information table 85 indicating the contents of the video data of each broadcast program in each time period, whereby both the interlaced scanning type video data and the non-interlace scanning type video data can be transmitted so that the video data of each of these scan methods is reproduced correctly at the receiving end, resulting in improved degree of freedom in programming of broadcast programs to be transmitted. Further, describing the scan methods in the event information table 85 is omitted for the program whose broadcast programs are of a same scanning type while this description is performed for the program in which scan method differs from broadcast program to broadcast program, whereby the amount of information to be transmitted is reduced compared with the case of performing the description for the broadcast programs of all the programs, resulting in reduction in transmission rate, processing load, and processing time.

Moreover, the video data transmitting apparatus according to the eighth embodiment which has the same configuration as that of the first embodiment can implement the above-described transmission method and obtain the aforesaid effects.

Furthermore, the video data transmitting apparatus according to the eighth embodiment which has the same configuration as that of the first embodiment can reproduce both the non-interlace scanning type video data and the interlaced scanning type video data in the multiplexed data transmitted by the foregoing transmission method and display the reproduced data.

Embodiment 9

A method of transmitting video data and a video data transmitting apparatus according to a ninth embodiment of the invention enable to multiplex and transmit pieces of video data of different scan methods on a broadcast program basis by adding identification information to a SDT (service description table) which is service information, and a video data reproducing apparatus according to the ninth embodiment is capable of reproducing the resultant multiplexed data correctly.

Figure 28:
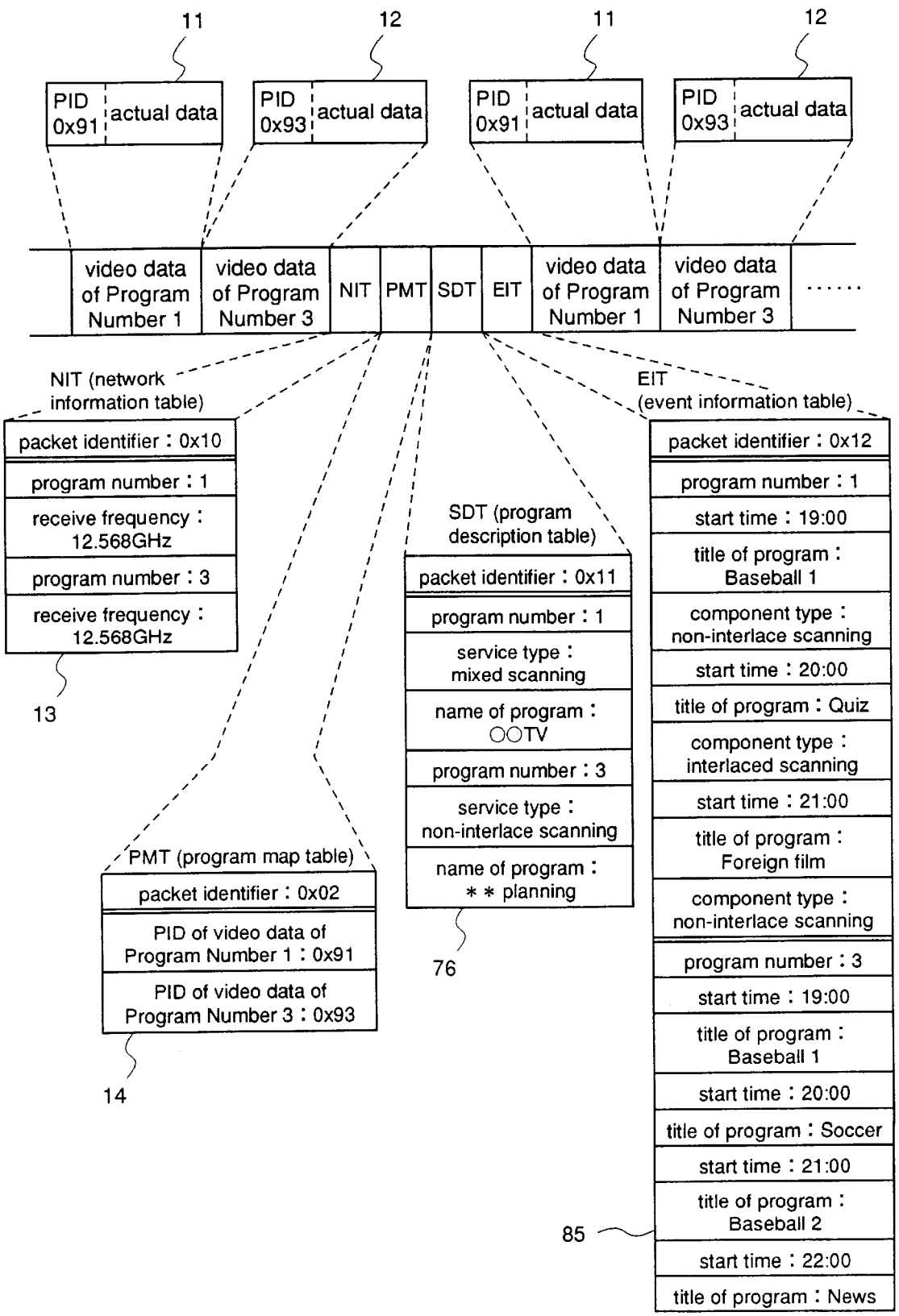
FIG. 28 is a diagram illustrating a structure of multiplexed data transmitted by a method of transmitting video data according to a ninth embodiment of the invention.

FIG. 28 is a diagram illustrating a data structure of transmission data in the method of transmitting video data of the ninth embodiment. The differences between this and the transmission data in the second prior art method shown in FIG. 32 are as follows: one point is that the SDT (service description table) 76 includes service type which is a code indicating whether video data is of a non-interlace scanning type or of an interlaced scanning type; the other point is that component type indicating the components of broadcast program can be described into the EIT (event information table) 85, and in some programs, the component type includes a code for judging whether video data is of a non-interlace scanning type or of an interlaced scanning type. The data structure of the SDT (service description table) is equal to that of the seventh embodiment, and the assignment of the service codes in the service list is equal to that of the eighth embodiment. Therefore, the service type codes are equal to those shown in FIG. 27 and codes 0x01 to 0x04 indicate interlaced scanning and codes 0x05 to 0x08 indicate non-interlace scanning and, programs each including broadcast programs of different scan methods are assigned codes 0x11 to 0x14. The code assignment is not restricted to this example as in the first embodiment.

The video data transmitting apparatus and video data reproducing apparatus according to the ninth embodiment have the same configuration as those of the first embodiment, and thus FIG. 1 is used for the explanation.

Next, the video data transmitting apparatus 100 and video data reproducing apparatus 200 according to the ninth embodiment will be described.

In the transmitting apparatus 100, video data packets are formed. The broadcast programs included in each program may be of a same scanning type on a program basis, and programs including broadcast programs of different scan methods may be applied. In this case, pieces of video data of different scan methods, that is, non-interlace scanning type video data and interlaced scanning type video data are employed for the broadcast programs included in Program Number 1, and packets are formed from the following pieces of data: "Baseball 1" obtained from the non-interlace scanning type video data storage unit 21, "Quiz" obtained from the interlaced scanning type video data storage unit 22, and "Foreign film" obtained from the non-interlace scanning type video data storage unit 21. On the other hand, for each broadcast program included in Program Number 3, employed is non-interlace scanning type video data only. The pieces of video data are obtained from the respective storage units, and the video data packets of the respective programs to which PIDs are added are formed in the same method used in the first embodiment.

Next, service information packets are formed. In the ninth embodiment, the EIT packet is formed after the formation of the SDT packet. Initially, the SDT packet is formed. 0x11 is assigned as the PID which is the header of the SDT packet. Then, the following data is stored in the SDT as the information about Program Number 1.

program number 1: 1
service type: 0x11 (code indicating mixed scanning)
name of program: OO TV Next, the following data is stored in the SDT as the information about Program Number 3.

program number: 3
service type: 0x05 (code indicating non-interlace scanning)
name of program: ** planning Then, EIT packet is formed. Initially, 0x12 is assigned as the PID which is the header of the EIT packet. Then, since Program number 1 includes broadcast programs of different scan methods, the following data is stored as the information about the program in the EIT.

start time: 19:00
title of program: Baseball 1
component type: 0x21 (code indicating non-interlace scanning)
start time: 20:00
title of program: Quiz
component type: 0x01 (code indicating interlaced scanning)
start time: 21:00
title of program: Foreign film
component type: 0x21 (code indicating non-interlace scanning)

Next, since Program Number 3 comprises non-interlace scanning type broadcast programs only, the following data is stored in the EIT as the information about the program.

start time: 19:00
title of program: Baseball 1
start time: 20:00
title of program: Soccer
start time: 21:00
title of program: Baseball 2
start time: 21:00
title of program: News That is, for Program Number 3, EIT packet is formed without giving a code indicating scan method to the component type.

Thereafter, the service information packets including the NIT and the EIT, the video data packets of Program Number 1 and Program Number 3 are multiplexed by the multiplexing unit 24, and the resultant multiplexed data is transmitted from the transmitting unit 25.

Further, the procedure in which the video data reproducing apparatus 200 receives the transmission data shown in FIG. 28 and performs reproduction operation is as follows.

First of all, the receiving unit 1 receives the multiplexed data transmitted, and the separating unit 2 separates and extracts the PMT packet with the packet identifier PID 0x02 as the key and the SDT packet with the packet identifier PID 0x11 as the key, and the EIT packet with the packet identifier PID 0x12 as the key.

Then, the data of the PMT is decoded to obtain the information: "the PID of the video data of Program Number 1 is 0x91" and "the PID of the video data of Program Number 3 is 0x93", and such information is stored in the identification information storage unit 5. The data of the SDT is decoded to obtain the information: "the scan method for the video data of Program Number 1 is mixed scanning" and "the scan method for the video data of Program Number 3 is non-interlace scanning". Then, for Program Number 1 which is found to be of a mixed scanning type, the data of the EIT is decoded to obtain the information, for example, "the scan method for the video data of Program Number 1 is interlaced scanning", when the current time is within a time range from 20:00 to 21:00, and this information is stored with the previously obtained information that the scan method for the video data of Program Number 3 is non-interlace scanning in the identification information storage unit 5.

Then, program selection from viewer is accepted through the medium of a remote controller or channel buttons of a monitor and, when a viewer selects Program Number 1, it is recognized on the basis of the information from the identification information storage unit 5 that the PID of the video data to be reproduced is 0x91 and the scan method for this data is interlaced scanning. The program selecting unit 6 instructs the separating unit 2 to separate a packet whose PID is 0x91 and the scan method instruction unit 7 gives decode instruction to the interlaced scanning type decoding unit 4. On the other hand, when the viewer selects Program Number 3, it is recognized on the basis of the information from the identification information storage unit 5 that the PID of the video data is 0x93 and the scan method for the data is non-interlace scanning. The program selecting unit 6 instructs the separating unit 2 to separate a packet whose PID is 0x93 and the scan method instruction unit 7 gives decode instruction to the non-interlace scanning type decoding unit 3.

As described above, in the method of transmitting video data according to the ninth embodiment wherein plural pieces of video data of plural broadcast programs are divided into packets, respectively, and the plural packets of the video data and packets including information about the broadcast programs are multiplexed and then transmitted, the video data whose reproduction mode is non-interlace scanning on a broadcast program basis and the video data whose reproduction mode is interlaced scanning on a broadcast program basis are transmitted as the pieces of video data of plural broadcast programs, and the information for judging whether video data is of a non-interlace scanning type, of an interlaced scanning type, or of a mixed scanning type is transmitted, which information is described in the service description table 76 containing the name and service type of each program, and for the program whose scan method is mixed scanning, the information for identifying the scan method for each broadcast program is transmitted, which information is described in the event information table 85 indicating the content of the video data of each broadcast program in each time period, whereby both interlaced scanning type video data and non-interlace scanning type video data can be transmitted so that the video data of each of these scan methods is reproduced correctly at the receiving end, resulting in improved degree of freedom in programming of broadcast programs to be transmitted. Further, describing the scan method in the event information table 85 is omitted for a program including broadcast programs of same scan method while this description is performed for a program including broadcast programs of different scan methods, whereby the amount of information to be transmitted can be reduced compared with the case of performing description to the broadcast programs of every program, resulting in reduction in transmission rate, cost of processing, and processing time.

Moreover, the video data transmitting apparatus according to the ninth embodiment which has the same configuration as that of the first embodiment can implement the above-described transmission method and obtain the aforesaid effects.

Furthermore, the video data transmitting apparatus according to the ninth embodiment which has the same configuration as that of the first embodiment can reproduce both the non-interlace scanning type video data and the interlaced scanning type video data in the multiplexed data transmitted by the foregoing transmission method correctly and display them.

Moreover, the video data reproducing apparatus according to any of the sixth to ninth embodiments may have the configuration as those of the fourth embodiment which comprises an output switching unit, whereby video data of either scan method can be reproduced corresponding to the performance of the video display unit as in the fourth embodiment.

In addition, the video data transmitting apparatus according to the sixth to ninth embodiments may transmit the program guide information as shown in the fifth embodiment and thus display the same program guide as that of the fifth embodiment, preventing the incorrect selection operation by viewer.

INDUSTRIAL AVAILABILITY

As described above, in a method of transmitting video data according to claims 1 to 10 of the invention, plural pieces of video data of plural broadcast programs are respectively divided into packets and the plural packets of the video data and packets including information about the broadcast programs are multiplexed and transmitted, video data whose reproduction mode is non-interlace scanning and video data whose reproduction mode is interlaced scanning are transmitted as the pieces of video data of plural broadcast programs, and the information for judging whether the video data of a broadcast program is of a non-interlace scanning type or of an interlaced scanning type being described in the packets including the information about the broadcast programs is transmitted, whereby the non-interlace scanning type video data and the interlaced scanning type video data can be transmitted such that the video data of each of these scan methods is correctly reproduced and displayed at the receiving end, resulting in improved degree of freedom in programing of broadcast programs to be transmitted.

According to a method of transmitting video data of claim 11, in the method according to any of claims 1 to 10, for each program comprising plural broadcast programs, it has been previously determined whether the scan method of each video data of the broadcast programs in the program is either non-interlace scanning or interlaced scanning, and the information for identifying the scan method of the video data is given to each program, whereby even the video images of different scan methods can be transmitted efficiently such that these video images are reproduced correctly at the receiving end.

According to a method of transmitting video data of claim 12, in the method according to any of claims 1 to 10, for each program comprising plural broadcast programs, it has been previously determined whether the video data of each broadcast program in the program is either of a non-interlace scanning type or of an interlaced scanning, or whether the video data of a non-interlace scanning type and that of an interlaced scanning type are mixed in program unit, and the information for identifying the scan method of video data is given to each program, and to each broadcast program, whereby pieces of data of different scan methods can be present in a program, resulting in improved degree of freedom in programming of broadcast programs to be transmitted.

According to a method of transmitting video data of claim 13, in the transmission method of claim 12, only when the information for identifying the scan method of the video data, which is given to each program, indicates that the video data of a non-interlace scanning type and that of an interlaced scanning type are mixed in program unit, the information for identifying the scan method of the video data is given to each broadcast program included in each program, whereby pieces of data of different scanning types can be present in a program, resulting in greatly improved degree of freedom in programing of broadcast programs to be transmitted can be improved greatly, improved efficiency in forming transmission data, and reduced transmission rate for transmission data.

A video data transmitting apparatus of claim 14 which divides plural pieces of video data of plural broadcast programs into packets, respectively, and multiplexes and transmits the plural packets of the video data and packets including information about the broadcast programs, comprises: a multiplexing unit for multiplexing packets of video data whose reproduction mode is non-interlace scanning and packets of video data whose reproduction mode is interlaced scanning, and packets including the information about the broadcast programs, which information includes the information for judging whether video data is of a non-interlace scanning type or of an interlaced scanning type; and a transmitting unit for transmitting the transmission data multiplexed by the multiplexing unit, whereby both non-interlace scanning type video data and interlaced scanning type video data can be transmitted such that the pieces of video data of different scan methods are reproduced correctly at the receiving end, resulting in improved degree of freedom in programing of broadcast programs to be transmitted.

A video data reproducing apparatus of claim 15 comprises: a receiving unit for receiving the information including at least non-interlace scanning type video data, interlaced scanning type video data, and identification data for judging whether the video data is of a non-interlace scanning type or of an interlaced scanning type; a separating unit for extracting video data which is selected by operator and the identification data from the information input from the receiving unit; a program selecting unit for accepting the selection of video data by the operator and informing the separating unit of the video data to be extracted; an identification information storage unit for storing the identification data separated and extracted by the separating unit; a non-interlace scanning type decoding unit for decoding the non-interlace scanning type video data separated and extracted by the separating unit and outputting the same as a video signal; an interlaced scanning type decoding unit for decoding the interlaced scanning type video data separated and extracted by the separating unit and outputting the same as a video signal; and a scanning instruction unit for identifying the video scan method of the video data selected by the operator based on the information in the identification information storage unit, and giving decode instruction to the non-interlace scanning type video decoding unit for the non-interlace scanning type video data and to the interlaced scanning type video decoding unit for the interlaced scanning type video data, whereby both non-interlace scanning type video data and interlaced scanning type video data can be reproduced correctly and displayed.

According to the video data reproducing unit of claim 16, the apparatus of claim 15 further includes an output switching unit for receiving the respective video signals from the non-interlace scanning type video decoding unit and the interlaced scanning type video decoding unit, and selectively outputting the video signal from the non-interlace scanning type video decoding unit or that from the interlaced scanning type video decoding unit, on the basis of the instruction from the scan method instruction unit, whereby video data of each of the scan methods can be correctly reproduced at a display unit conforming to both of the scan methods.

According to the video data reproducing unit of claims 17 and 18, in the apparatus of claim 16, the output switching unit directly outputs video data of a scan method while it converts video data of another scan method to that of the aforesaid scan method and outputs the converted data, whereby video data of each of the scan methods can be correctly reproduced at a display unit conforming to one of the scan methods.

A video data reproducing apparatus of claims 19 and 21 which selects and reproduces one of plural broadcast programs transmitted by a method of transmitting video data wherein plural pieces of video data of plural broadcast programs including interlaced scanning type video data and non-interlace scanning type video data are multiplexed along with an event information table indicating the contents of the video data of each broadcast program in each time period and the information for judging whether the video data of each broadcast program included in the event information table is of a non-interlace scanning type or of an interlaced scanning type to be transmitted, further comprises a program guide forming means for forming a program guide showing the contents of each broadcast program in each time period and the scan method of the video data based on the event information table and the identification information and outputting the program guide on a display screen of a video display unit as visible information, whereby the scan method of a broadcast program to be selected can be confirmed and thus incorrect selection can be prevented.

According to the video data reproducing apparatus of claims 22 or 23, the apparatus of any of claims 19 to 21 further comprises a notification unit for notifying, as visible information or audible information, that video reproduction is impossible when a broadcast program is selected incapable of being reproduced by this reproducing apparatus because of the scan method of the video data of the selected broadcast program, whereby incorrect selection by viewer can be prevented more effectively.

According to the video data reproducing apparatus of claims 24 or 25, in the apparatus of claim 19, the program guide forming means displays broadcast programs reproducible by the reproducing apparatus because the scanning type of the broadcast programs agrees to that of the reproducing apparatus, whereby incorrect selection by viewer can be prevented more effectively.

What is claimed is:

1. A method of transmitting video data in which plural pieces of video data of plural broadcast programs are divided into packets, and the plural packets of the video data and packets including information about the broadcast programs are multiplexed and transmitted, wherein the packet including information about the broadcast programs is a program map table which shows through which packet a broadcast program is transmitted, and further wherein both video data whose reproduction mode is a non-interlace scanning mode and video data whose reproduction mode is an interlaced scanning mode are transmitted as the pieces of video data of plural broadcast programs, and information for judging whether video data of a broadcast program is of a non-interlaced scanning type or of an interlaced scanning type being described in a packet including information about the broadcast programs is described in a system management identifier which is one of a plurality of system management descriptors as the descriptors about program information in the program map table and is transmitted in a respective scanning mode, whereby conversion between non-interlace and interlaced scanning modes is avoided.

2. A method of transmitting video data as defined in claim 1 wherein, for each program comprising plural broadcast programs, it has been previously determined whether the video data of each broadcast program included in the program is either of a non-interlace scanning type or of an interlaced scanning type, and the information for identifying the scan method of the video data is given to each program.

3. A method of transmitting video data as defined in claim 1, wherein for each program comprising plural broadcast programs, it has been previously determined whether the video data of each broadcast program included in the program is either of a non-interlace scanning type or of an interlaced scanning type, or whether the video data of a non-interlace scanning type and that of an interlaced scanning type are mixed in program unit, and the information for identifying the scan method of video data is given to each program, and to each broadcast program.

4. A method of transmitting video data as defined in claim 3, wherein only when the information for identifying the scan method of the video data, which is given to each program, indicates that the video data of a non-interlaced scanning type and that of an interlaced scanning type are mixed in program unit, the information for identifying the scan method of the video data is given to each broadcast program included in each program.

5. A video data reproducing apparatus for selecting and reproducing one of plural broadcast programs transmitted by a method of transmitting video data wherein plural pieces of video data of plural broadcast programs including interlaced scanning type video data and non-interlace scanning type video data are multiplexed with an event information table indicating the contents of the video data of each broadcast program in each time period and the information for judging whether the video data of each broadcast program included in the event information table is of a non-interlace scanning type or of an interlaced scanning type to be transmitted, said apparatus including a program guide forming means for forming a program guide showing the contents of each broadcast program in each time period and the scan method of the video data based on the event information table and the identification information and outputting the program guide on a display screen of a video display unit as visible information;

scanning method memory means for storing each program; and a notification unit for notifying, as visible information or audible information, that video reproduction is impossible when a broadcast program whose video data is a non-interlace scanning type is selected.

6. A video data reproducing unit as defined in claim 5, wherein the program guide forming means outputs, as visible information, the broadcast program information for non-interlace scanning type video data and the broadcast program information for interlaced scanning type video data separately in separate tabular form on a display screen.

7. A video data reproducing unit as defined in claim 5, wherein the program guide forming means outputs, as visible information, the broadcast program information for non-interlace scanning type video data and the broadcast program information for interlaced scanning type video data together in tabular form on a display screen.

8. A method of transmitting video data in which plural pieces of video data of plural broadcast programs are divided into packets, and the plural packets of the video data and packets including information about the broadcast programs are multiplexed and transmitted, wherein the packet including information about the broadcast programs is an event information table which shows the content of the video data of a broadcast program, and further wherein both video data whose reproduction mode is a non-interlace scanning mode and video data whose reproduction mode is an interlaced scanning mode are transmitted as the pieces of video data of plural broadcast programs, and information for judging whether video data of a broadcast program is of a non-interlaced scanning type or of an interlaced scanning type being described in a packet including information about the broadcast programs is described in a component identifier indicating the attribute of a video in the event information table and is transmitted in a respective scanning mode, whereby conversion between non-interlace and interlaced scanning modes is avoided.

9. A method of transmitting video data in which plural pieces of video data of plural broadcast programs are divided into packets, and the plural packets of the video data and packets including information about the broadcast programs are multiplexed and transmitted, wherein the packet including information about the broadcast programs is a network information table which shows through which channel a broadcast program is transmitted, and further wherein both video data whose reproduction mode is a non-interlace scanning mode and video data whose reproduction mode is an interlaced scanning mode are transmitted as the pieces of video data of plural broadcast programs, and information for judging whether video data of a broadcast program is of a non-interlaced scanning type or of an interlaced scanning type being described in a packet including information about the broadcast programs is transmitted in a respective scanning mode and is described in a network identifier in the program information table which identifies a network through which video data is transmitted, whereby conversion between non-interlace and interlaced scanning modes is avoided.

10. A method of transmitting video data in which plural pieces of video data of plural broadcast programs are divided into packets, and the plural packets of the video data and packets including information about the broadcast programs are multiplexed and transmitted, wherein the packet including information about the broadcast programs is a network information table which shows through which channel a broadcast program is transmitted, and further wherein both video data whose reproduction mode is a non-interlace scanning mode and video data whose reproduction mode is an interlaced scanning mode are transmitted as the pieces of video data of plural broadcast programs, and information for judging whether video data of a broadcast program is of a non-interlaced scanning type or of an interlaced scanning type being described in a packet including information about the broadcast programs is transmitted in a respective scanning mode and is described in a service type identifier included among service list descriptors in the network information table which describes the information regarding provision of video data, whereby conversion between non-interlace and interlaced scanning modes is avoided.

11. A method of transmitting video data in which plural pieces of video data of plural broadcast programs are divided into packets, and the plural packets of the video data and packets including information about the broadcast programs are multiplexed and transmitted, wherein the packet including information about the broadcast programs is a service description table which shows the information about provision of video data, and further wherein both video data whose reproduction mode is a non-interlace scanning mode and video data whose reproduction mode is an interlaced scanning mode are transmitted as the pieces of video data of plural broadcast programs, and information for judging whether video data of a broadcast program is of a non-interlaced scanning type or of an interlaced scanning type being described in a packet including information about the broadcast programs is transmitted in a respective scanning mode and is described in a service type identifier in the service description table which shows the service type, whereby conversion between non-interlace and interlaced scanning modes is avoided.

12. A video data reproducing apparatus comprising:

a receiving unit for receiving in packet style information including at least coded non-interlace scanning type video data, coded interlaced scanning type video data, and a program map table including identification data for judging for each program unit whether the video data is of a non-interlace scanning type or of an interlaced scanning type;

a separating unit for separating and extracting the program map table from the information input from the receiving unit, as well as decoding the program map table, to separate and extract video data which is selected;

a program selecting unit for accepting the selection of video data and informing the separating unit of the video data to be extracted based on the instruction from the program map table;

an identification information storage unit for storing at least the identification data of the program map table separated and extracted by the separating unit;

a non-interlace scanning type decoding unit for decoding the coded non-interlace scanning type video data separated and extracted based on the instruction from the program selecting unit by the separating unit and outputting the same as a non-interlace scanning type video signal;

an interlaced scanning type decoding unit for decoding the coded interlaced scanning type video data separated and extracted based on the instruction from the program selecting unit by the separating unit and outputting the same as an interlaced scanning type video signal; and a scanning instruction unit for identifying the video scan method of the video data selected by the operator based on the identification data in the identification information storage unit, and giving decode instruction to the non-interlace scanning type video decoding unit for the non-interlace scanning type video data and to the interlaced scanning type video decoding unit for the interlaced scanning type video data.

13. A video data reproducing apparatus for selecting and reproducing one of plural broadcast programs transmitted by a method of transmitting video data wherein plural pieces of video data of plural broadcast programs including interlaced scanning type video data and non-interlace scanning type video data are multiplexed with an event information table indicating the contents of the video data of each broadcast program in each time period and the information for judging whether the video data of each broadcast program included in the event information table is of a non-interlace scanning type or of an interlaced scanning type to be transmitted, said apparatus including a program guide forming means for forming a program guide showing the contents of each broadcast program in each time period and the scan method of the video data based on the event information table and the identification information and outputting the program guide on a display screen of a video display unit as visible information;

scanning method memory means for storing each program; and a notification unit for notifying, as visible information or audible information, that video reproduction is impossible when a broadcast program whose video data is an interlace scanning type is selected.

14. A video data reproducing apparatus for selecting and reproducing one of plural broadcast programs transmitted by a method of transmitting video data wherein plural pieces of video data of plural broadcast programs including interlaced scanning type video data and non-interlace scanning type video data are multiplexed with an event information table indicating the contents of the video data of each broadcast program in each time period and the information for judging whether the video data of each broadcast program included in the event information table is of a non-interlace scanning type or of an interlaced scanning type to be transmitted, said apparatus including a program guide forming means for forming a program guide showing the contents of each broadcast program in each time period and the scan method of the video data based on the event information table and the identification information and outputting the program guide on a display screen of a video display unit as visible information, the program guide forming means outputting only a program guide about broadcast programs whose video data is of an interlaced scanning type; and scanning method memory means for storing each program.

15. A video data reproducing apparatus for selecting and reproducing one of plural broadcast programs transmitted by a method of transmitting video data wherein plural pieces of video data of plural broadcast programs including interlaced scanning type video data and non-interlace scanning type video data are multiplexed with an event information table indicating the contents of the video data of each broadcast program in each time period and the information for judging whether the video data of each broadcast program included in the event information table is of a non-interlace scanning type or of an interlaced scanning type to be transmitted, said apparatus including a program guide forming means for forming a program guide showing the contents of each broadcast program in each time period and the scan method of the video data based on the event information table and the identification information and outputting the program guide on a display screen of a video display unit as visible information, the program guide forming means outputting only a program guide about broadcast programs whose video data is of a non-interlace scanning type; and scanning method memory means for storing each program.

* * * * *

UNITED STATES PATENT AND TRADEMARK OFFICE
CERTIFICATE OF CORRECTION

PATENT NO. : 6,151,078
DATED : November 21, 2000
INVENTOR(S) : Yasushi YONEDA et al.

It is certified that error appears in the above-identified patent and that said Letters Patent is hereby corrected as shown below:

On the title page, column 1, [86] change the § 371 date from "December 4, 1997" to -- February 3, 1998--.

On the title page, column 1, [86] change the § 102(e) date from "December 4, 1997" to -- February 3, 1998--.

Signed and Sealed this

Eighth Day of May, 2001

Attest:

NICHOLAS P. GODICI

Attesting Officer

Acting Director of the United States Patent and Trademark Office